United States Patent
Kang et al.

(10) Patent No.: US 11,280,491 B2
(45) Date of Patent: Mar. 22, 2022

(54) FURNACE WITH INTEGRATED HEAT RECOVERY UTILIZING RADIATIVE RECUPERATOR FOR PREHEATING COMBUSTION REACTANTS USING HEAT FROM FLUE GAS

(71) Applicants: American Air Liquide, Inc., Fremont, CA (US); L'Air Liquide, Societe Anonyme pour l'Etude et l'Exploitation des Procedes Georges Claude, Paris (FR)

(72) Inventors: Taekyu Kang, Newark, DE (US); James J. F. McAndrew, Chadds Ford, PA (US); Remi Tsiava, Saint Germain-les-Corbeil (FR); Jiefu Ma, Bear, DE (US); Ryan Adelman, Houston, TX (US); Henri Chevrel, Le Chesnay (FR)

(73) Assignees: L'Air Liquide Societe Anonyme Pour L'Etude Et L'Exploitation Des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 248 days.

(21) Appl. No.: 16/543,049

(22) Filed: Aug. 16, 2019

(65) Prior Publication Data
US 2019/0368728 A1 Dec. 5, 2019

Related U.S. Application Data

(60) Division of application No. 15/947,549, filed on Apr. 6, 2018, now Pat. No. 10,465,904, which is a
(Continued)

(51) Int. Cl.
*F23D 14/66* (2006.01)
*F23C 5/08* (2006.01)
(Continued)

(52) U.S. Cl.
CPC ............... *F23D 14/66* (2013.01); *F23C 5/10* (2013.01); *F23D 91/02* (2015.07); *F23K 5/20* (2013.01);
(Continued)

(58) Field of Classification Search
CPC ........ F23D 14/66; F27D 17/004; F27B 3/266; F23C 5/10; F23C 2202/10; F23L 15/045; C03B 5/237
See application file for complete search history.

(56) References Cited

U.S. PATENT DOCUMENTS

| 2,856,905 A | 10/1958 | Bowen, III |
| 3,220,713 A | 11/1965 | Stookey |

(Continued)

FOREIGN PATENT DOCUMENTS

| CN | 2011 846 96 Y | 1/2009 |
| CN | 102759130 | 10/2012 |

(Continued)

OTHER PUBLICATIONS

Goruney, T., et al., "Oxy-Fuel Tableware Furnace with Novel Oxygen- and Natural Gas Preheating System", 77th Conference on Glass Problems: Ceramic Engineering and Science Proceedings, vol. 38 (001), Published online: Jun. 23, 2017 (http://onlinelibrary.wiley.com/doi/10.1002/9781119417507.ch7/summary.).

(Continued)

*Primary Examiner* — Steven S Anderson, II
(74) *Attorney, Agent, or Firm* — Christopher J. Cronin

(57) ABSTRACT

A radiative recuperator preheats oxidant and/or fuel for combustion at one or more burners of a furnace. The
(Continued)

recuperator includes a duct, at least portions of which comprise a material having a thermal conductivity of greater than 1 W/(m·K), preferably greater than 3 W/(m·K), that receives hot flue gas produced by the burner(s). The duct radiatively transfers heat to oxidant or fuel (for preheating) flowing through one or more metallic pipes disposed in between the duct and an insulating wall.

16 Claims, 24 Drawing Sheets

Related U.S. Application Data continuation-in-part of application No. 15/639,660, filed on Jun. 30, 2017, now abandoned.

(51) Int. Cl.

| | |
|---|---|
| *F23L 15/04* | (2006.01) |
| *F27B 3/26* | (2006.01) |
| *F27D 17/00* | (2006.01) |
| *F28D 7/16* | (2006.01) |
| *F23K 5/20* | (2006.01) |
| *F28D 21/00* | (2006.01) |
| *F23D 99/00* | (2010.01) |
| *F28D 7/10* | (2006.01) |
| *F23L 7/00* | (2006.01) |

(52) U.S. Cl.
CPC ............ *F23L 7/007* (2013.01); *F23L 15/045* (2013.01); *F27B 3/266* (2013.01); *F27D 17/004* (2013.01); *F28D 7/106* (2013.01); *F28D 7/1669* (2013.01); *F28D 21/0003* (2013.01); *F23C 2202/10* (2013.01)

(56) References Cited

U.S. PATENT DOCUMENTS

| | | | |
|---|---|---|---|
| 3,797,569 | A | 3/1974 | Meder et al. |
| 4,467,959 | A * | 8/1984 | Laviguer ............ F28D 21/0007 |
| | | | 122/20 B |
| 5,107,798 | A | 4/1992 | Gerep |
| 5,154,139 | A | 10/1992 | Johnson |
| 5,876,469 | A | 3/1999 | Moriya et al. |
| 6,250,916 | B1 | 6/2001 | Philippe et al. |
| 9,618,203 | B2 | 4/2017 | Kang et al. |
| 2002/0005152 | A1 | 1/2002 | Namba et al. |
| 2009/0298002 | A1 | 12/2009 | Constantin et al. |
| 2010/0186644 | A1 * | 7/2010 | Sugitatsu ............. F27D 17/004 |
| | | | 110/203 |
| 2011/0131961 | A1 | 6/2011 | Lee et al. |
| 2014/0033702 | A1 | 2/2014 | Limbeck et al. |
| 2014/0087316 | A1 * | 3/2014 | Kang ..................... F23D 14/66 |
| | | | 431/11 |

FOREIGN PATENT DOCUMENTS

| | | |
|---|---|---|
| DE | 102007062418 | 6/2009 |
| FR | 2 966 560 | 4/2012 |
| GB | 1 587 733 | 4/1981 |
| WO | WO 98/27017 | 6/1998 |

OTHER PUBLICATIONS

Kobaushi, H., et al. "TCF Technology for Oxy-Fuel Glassmelting" (Part One), American Ceramic Society Bulletin, vol. 84, No. 2 (Feb. 2005), pp. 14-19.

International Search Report and Written Opinion for corresponding to PCT/US2018/039031, dated Oct. 16, 2018.

J&G Refractories, Tube Wall Protection System JuSyS Air Brochure, Issue: 2011-11-23/Hopp, 16 pgs.

* cited by examiner

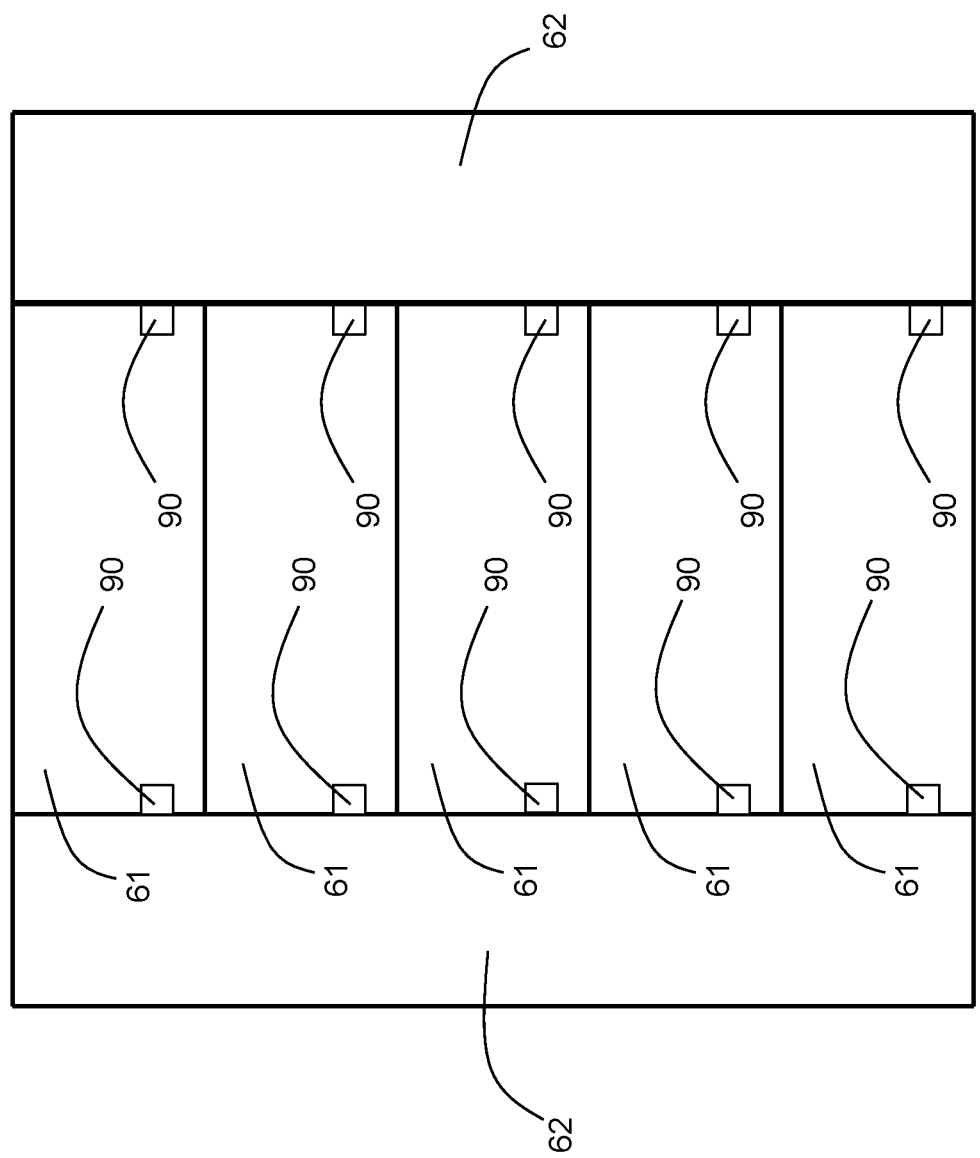

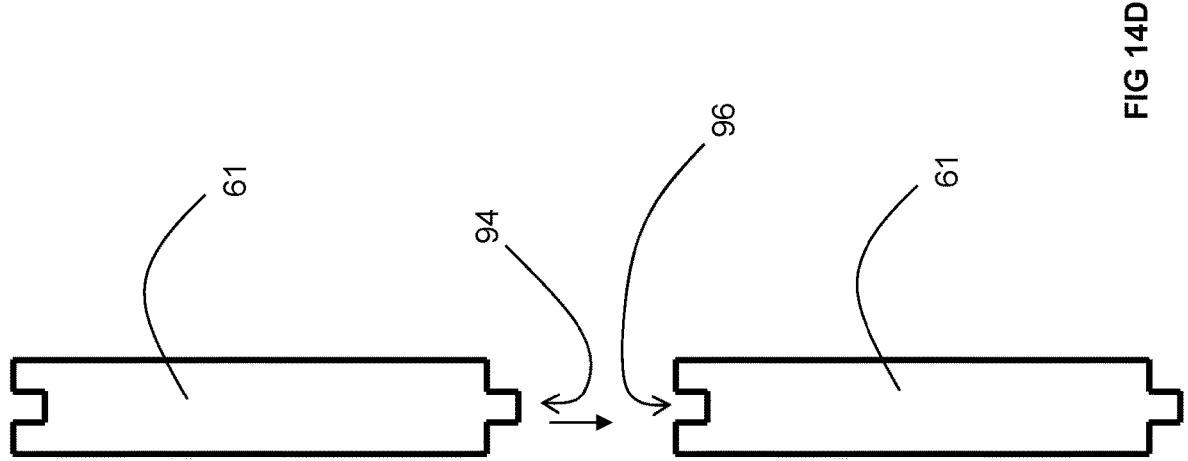

FURNACE WITH INTEGRATED HEAT RECOVERY UTILIZING RADIATIVE RECUPERATOR FOR PREHEATING COMBUSTION REACTANTS USING HEAT FROM FLUE GAS

CROSS-REFERENCE TO RELATED APPLICATIONS

This application is a divisional of U.S. patent application Ser. No. 15/947,549, filed Apr. 6, 2018, which is a continuation-in-part of U.S. Non-Provisional patent application Ser. No. 15/639,660 filed Jun. 30, 2017, the entire contents of which are incorporated herein by reference.

BACKGROUND

Field of the Invention

The present invention relates to preheating one or both types combustion reactants (i.e., oxidant and/or fuel) for combustion at one or more burners of a furnace using waste heat from flue gas produced in the furnace.

Related Art

Preheating air for combustion in a high temperature furnace through recovery of thermal energy from flue gas has achieved fuel savings in glass furnaces. For example, and as illustrated in FIG. 1, flows of a fuel F and preheated air HA are combusted by burners B of a furnace F producing a flow of flue gas FG. The flow of flue gas FG is conveyed by a conduit C to a metallic recuperator R which serves to transfer heat from the flue gas FG to a flow of air A which then becomes the flow of preheated air HA. As shown in FIG. 2, one type of recuperator for a preheated air-fired furnace has a double-pipe configuration in which the flow of flue gas FG is contained within a metallic inner pipe IP and exchanges heat across the inner pipe IP with a flow of air A contained in an annular space in between the inner pipe IP and an outer pipe OP. As illustrated in FIG. 3, another type of recuperator for a preheated air-fired furnace includes a plurality of inner pipes IP, containing flows of air A, that are disposed around the periphery of a cylindrical space enclosed by insulation refractory IR containing the flow of flue gas FG. To our knowledge, these latter two techniques (i.e., those including a single metallic interface between the flue gas and either oxygen or natural gas) have not been commercially applied to the preheating of oxygen and natural gas due to safety reasons. This is because the single metallic inner pipe or the ring of metallic inner pipes would be expected to fail in due course from the high temperature corrosive attack of the flue gas FG upon the metal of the pipes P. A leak of oxygen or natural gas into a flow of flue gas could lead to a catastrophic safety incident.

The technique of preheating combustion air has been applied with some success to oxy-fired glass furnaces (i.e., glass furnaces heated by burners combusting oxidant that is not air but instead is some form of oxygen-enriched gas such as industrially pure oxygen). However, heating the oxygen stream is extremely challenging, because the high reactivity of oxygen, especially at high temperature, places extreme constraints on the design and construction of the heat recovery system. For example, while it is a common practice to use a regenerator, through which flue gas and air flow in alternating cycles in order to preheat the air, it is generally considered impossible to use this technique with oxygen because of the fear that oxygen would react with contaminants inevitably present in the flue gas and deposited in the regenerator.

Similar to glass furnaces, the preheating of fuel and/or oxidant has also been proposed for metal melting furnaces.

In order to avoid the foregoing problem, U.S. Pat. No. 6,250,916 discloses one solution where hot combustion gas is used to preheat air which is used, in turn, to preheat oxygen. Also, Görüney et al. described one embodiment of the HeatOx system offered by Air Liquide in which air is first heated in a recuperator through heat exchange with the hot flue gas, and subsequently, the oxygen or natural gas is preheated with the hot air in a separate shell and tube heat exchanger (Görüney, et al., "Oxy-Fuel Tableware Furnace with Novel Oxygen- and Natural Gas Preheating System", 77th Conference on Glass Problems). While these approaches have been quite satisfactory, it can sometimes be somewhat limited in two regards. First, because of the necessity of having separate heat exchangers (for preheating of air and preheating of oxygen or natural gas), the associated capital cost can in certain situations deter investment in such a project due to the increased time necessary for a return on the investment. Second, the temperatures to which the oxygen or natural gas may be preheated are limited by the temperature of the preheated air. Therefore, the conventional technologies are limited in how much thermal energy that may be recovered from the hot flue gas and transferred to the oxygen or natural gas. Typically, the preheated air temperature is no more than 650° C.

Therefore, there is a need for preheating a combustion reactant for a furnace through recovery of heat from flue gas that exhibits a decreased risk of catastrophic safety failure. There is also a need for preheating a combustion reactant for a furnace through recovery of heat from flue gas that exhibits improved economics.

SUMMARY

There is disclosed a furnace utilizing recuperative heat exchange for preheating a combustion reactant with waste heat energy from flue gas, comprising: a combustion chamber including a combustion space enclosed by a furnace wall in which a fuel and an oxidant are combusted to heat solid and/or molten glass or glass-making material or solid and/or molten metal and thereby producing flue gas; one or more burners mounted in the furnace wall adapted and configured to inject preheated fuel and/or preheated oxidant into the combustion chamber interior for combustion therein; a duct extending along an axis and having a first end receiving at least a portion of the flue gas produced in the combustion chamber and a second opposed end discharging the received flue gas; one or more insulating walls extending parallel to the duct axis and adjacently to an outer surface of the duct, the insulating wall being comprised of an insulating material, an non-reactive gas space being defined between an outer surface of the duct and an inner surface of the insulating wall, one or more metallic pipes extending through the non-reactive gas space, the pipes receiving the combustion oxidant or the combustion fuel and discharging the combustion oxidant or the combustion fuel after being preheated, wherein at least portions of the duct are comprised of a material having a thermal conductivity of greater than 1 W/(m·K).

There is disclosed another furnace utilizing recuperative heat exchange for preheating a combustion reactant with waste heat energy from flue gas, comprising: a combustion chamber including a combustion space enclosed by a furnace wall in which a fuel and an oxidant are combusted to heat solid and/or molten glass or glass-making materials or solid and/or molten metal and thereby producing flue gas; one or more burners mounted in the furnace wall adapted and configured to inject preheated fuel and/or preheated oxidant into the combustion chamber interior for combustion therein; and a recuperator, the recuperator comprising: a duct comprising a set of four structural pillars disposed at four corners of the duct and also four duct portions each one of which extends between a pair of the pillars, the duct portions being made of a material having a thermal conductivity of greater than 1 W/(m·K), a set of four insulating walls each one of which extends adjacent and parallel to a respective one of the duct portions, a non-reactive gas space being disposed between each pair of adjacent and parallel extending duct portion and insulating wall; and one or more sets of a plurality of metallic pipes, each set extending through a respective one of the non-reactive gas spaces, each of the metallic pipes being adapted and configured to receive a flow of a combustion reactant and discharge the combustion reactant after preheating thereat, wherein the burners fluidly communicate with the metallic pipes for receiving preheated combustion reactant therefrom.

There is also disclosed a method of recuperative heat exchange for preheating a combustion reactant with waste heat energy from flue gas produced by a furnace. The method comprises the following steps. Fuel and oxidant are injected from one or more burners mounted in a furnace wall of a furnace into a combustion space within a combustion chamber enclosed by a furnace wall of the furnace and the injected fuel and oxidant are combusted in the combustion space thereby heat solid and/or molten glass or solid and/or molten metal and producing flue gas, wherein at least one of the fuel and oxidant is preheated. The flue gas is received at a first end of a duct extending along an axis, wherein at least portions of the duct are comprised of a material having a thermal conductivity of greater than 1 W/(m·K). The received flue gas is discharged from a second end of the duct. Heat is exchanged between the flue gas and the duct by radiative and convective heat exchange. Heat is exchanged between one or more of the portions of the duct comprised of a material having a thermal conductivity of greater than 1 W/(m·K) and the one or more and one or more metallic pipes opposite said portions by radiative heat exchange across an non-reactive gas space filled with non-reactive gas, the one or more metallic pipes extending through the non-reactive gas space, the non-reactive gas space being defined between an outer surface of the duct and an inner surface of an insulating wall that extends parallel to the duct axis and adjacent the outer surface of the duct opposite a portion comprised of a material having a thermal conductivity of greater than 1 W/(m·K). Heat is exchanged between the one or more metallic pipes and either fuel or oxidant flowing through the pipes by convective heat exchange to provide preheated fuel or preheated oxidant. The preheated fuel or preheated oxidant is fed to the one or more burners.

Any one or more of the furnaces or method may include one or more of the following aspects:
  the duct is a ceramic duct.
  the portions of the duct that are comprised of a material having a thermal conductivity of greater than 1 W/(m·K) are disposed opposite the one or more of the metallic pipes
  the non-reactive gas is air, the non-reactive gas space freely communicates with ambient air, optionally by natural convection, and no mechanical device is used to create a flow of air through the non-reactive gas space.
  a source of gaseous fuel is in flow communication with said one or more pipes.
  a source of oxidant is in flow communication with said one or more pipes.
  the oxidant is oxygen-enriched air, industrially pure oxygen, a mixture of industrially pure oxygen and recirculated flue gas, or a mixture of industrially pure oxygen and carbon dioxide
  the source of oxidant is a cryogenic air separation unit, a vapor swing adsorption unit, or a vaporizer fed with liquid oxygen from a liquid oxygen tank.
  the material having a thermal conductivity of more than 1 W/(m·K) is a ceramic material or a metal alloy,
  the material having a thermal conductivity of more than 1 W/(m·K). is a castable refractory having a SiC content of preferably 30% or above or 70% or above.
  an entirety of the duct is comprised of the material having a thermal conductivity of more than 1 W/(m·K).
  an entirety of the duct is comprised of the material having a thermal conductivity of more than 3 W/(m·K).
  some portions of the duct is comprised of the material having a thermal conductivity of more than 1 W/(m·K) and remaining portions of the duct are comprised of a material having a thermal conductivity of less than or equal to 1 W/(m·K).
  a wall thickness of the duct is 1-10 cm.
  the material having a thermal conductivity of more than 1 W/(m·K) is a metallic alloy and has a wall thickness of the duct is equal to or less than 10 cm.
  the duct has a rectangular cross-sectional configuration with first, second, third, and fourth sides and the one or more insulating walls comprises corresponding first, second, third, and fourth insulating walls; the first insulating wall is disposed adjacent to and spaced from a first of the sides and one or more of the metallic pipes extend through a first non-reactive gas space between the first insulating wall and first side; a second insulating wall is disposed adjacent to and spaced from a second of the sides and one or more of the metallic pipes extend through a second non-reactive gas space between the second insulating wall and second side; a third insulating wall is disposed adjacent to and spaced from a third of the sides and one or more of the metallic pipes extend through a third non-reactive gas space between the third insulating wall and third side; and a fourth insulating wall is disposed adjacent to and spaced from a fourth of the sides and one or more of the metallic pipes extend through a fourth non-reactive gas space between the fourth insulating wall and fourth side.
  each of the insulating walls is reversibly mounted to the duct and each of the duct sides opposite an insulating wall includes portions comprised of the material having a thermal conductivity of more than 1 W/(m·K); each of the duct sides also includes remaining portions comprised of a ceramic material having a thermal conductivity of equal to or less than 1 W/(m·K); and the portions comprised of the material having a thermal conductivity of more than 1 W/(m·K) are reversibly mounted in apertures formed in the remaining portions to allow any single one of the portions comprised of the material having a thermal conductivity of more than 1 W/(m·K) to be replaced without requiring the furnace to be shut down.
  the duct is comprised of four pillars disposed at a respective four corners of the duct and four duct portions each one of which extends between a respective pair of pillars so that a first of the four duct portions is parallel to a third of the four duct portions and a second of the four duct portions is perpendicular to the first of the four duct portions and parallel to a fourth of the four duct portions; the one or more insulating walls comprises corresponding first, second, third, and fourth insulating walls that extend parallel to the first, second, third, and fourth duct portions, respectively so as to define first, second, third, and fourth non-reactive gas spaces, respectively; a first set of one or more of the metallic pipes extends through the first non-reactive gas space; a second set of one or more of the metallic pipes extends through the second non-reactive gas space; a third set of one or more of the metallic pipes extends through the third non-reactive gas space; a third set of one or more of the metallic pipes extends through the third non-reactive gas space; and each of the four duct portions is comprised of the material having a thermal conductivity of more than 1 W/(m·K).

the one or more insulating walls comprises one insulating wall with a circular cross-sectional configuration which concentrically surrounds the duct which also has a circular cross-sectional configuration.

the non-reactive gas is air, the non-reactive gas space freely communicates with ambient air and no mechanical device is used to create a flow of air through the non-reactive gas space.

fuel flows through the one or more pipes and preheated fuel is fed to the one or more burners.

oxidant flows through the one or more pipes and preheated oxidant is fed to the one or more burners.

the oxidant is oxygen-enriched air, industrially pure oxygen, a mixture of industrially pure oxygen and recirculated flue gas, or a mixture of industrially pure oxygen and carbon dioxide.

the oxidant is industrially pure oxygen produced by a cryogenic air separation unit, a vapor swing adsorption unit, or a vaporizer fed with liquid oxygen from a liquid oxygen tank.

a totality of all oxidant fed to the one or more burners has an oxygen content of at least 24% by volume.

the material having a thermal conductivity of more than 1 W/(m·K) is a castable refractory, preferably of SiC, more preferably having a SiC content of at least 70%.

an entirety of the duct is comprised of the ceramic material having a thermal conductivity of more than 1 W/(m·K).

some portions of the duct is comprised of the material having a thermal conductivity of more than 1 W/(m·K) and remaining portions of the duct are comprised of a material having a thermal conductivity of less than or equal to 1 W/(m·K).

fuel is flowing through the pipes and preheated fuel is fed to the one or more burners.

fuel is flowing through some of the pipes, oxidant is flowing through other of the pipes, and preheated fuel and preheated oxidant are fed to the one or more burners.

a temperature of the flue gas is 1,100-1,550° C.

the material having a thermal conductivity of greater than 1 W/(m·K) has a thermal conductivity of greater than 3 W/(m·K).

the furnace is a glass furnace and the fuel and the oxidant are combusted to heat solid and/or molten glass or glass-making materials.

the furnace is a metal melting furnace and the fuel and the oxidant are combusted to heat solid and/or molten metal.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 14C is a front view schematic of the embodiments of FIGS. 13A-13C with parts removed in which duct portions are stacked on top of one another.

FIG. 14D is an exploded side view schematic of two of the duct portions of the embodiment of 14C.

DESCRIPTION OF PREFERRED EMBODIMENTS

Figure 1:
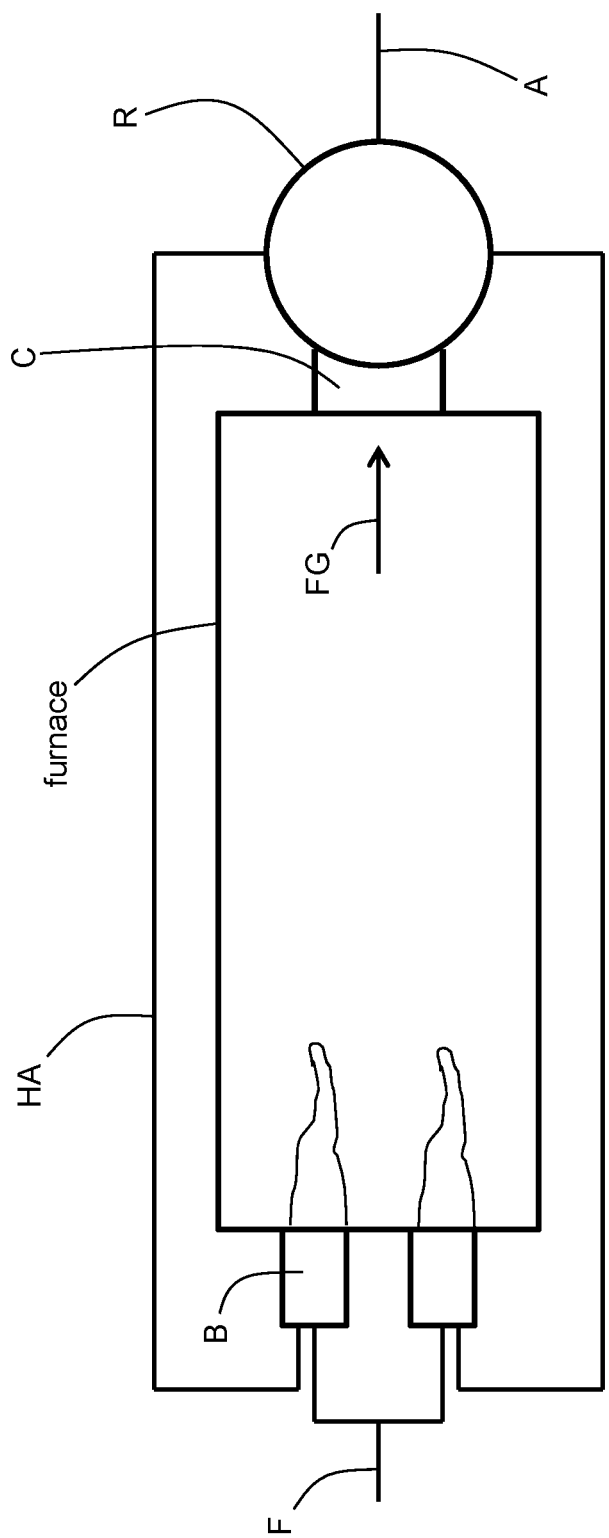
FIG. 1 is a top plan view schematic of a conventional preheated air-fired furnace.
Figure 2:
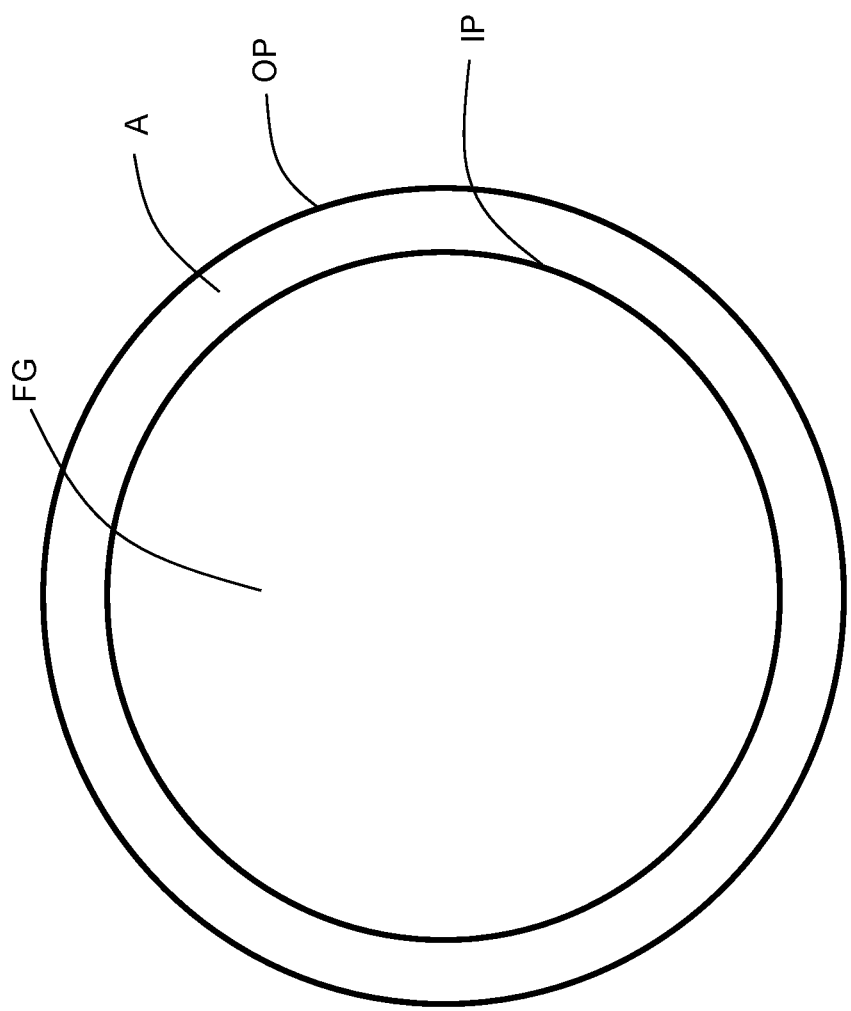
FIG. 2 is a top cross-sectional view schematic of one type of recuperator utilized in conventional preheated air-fired furnaces.
Figure 3:
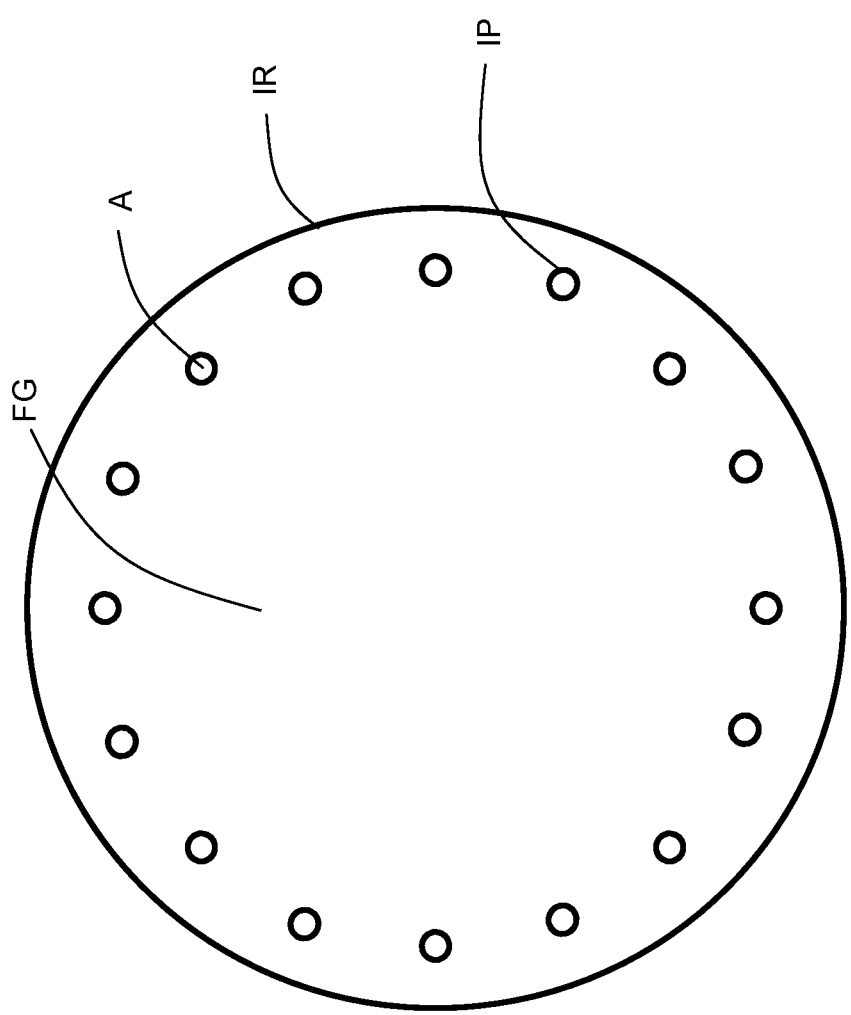
FIG. 3 is a top cross-sectional view schematic of one type of recuperator utilized in conventional preheated air-fired furnaces.

One or both combustion reactants (i.e., oxidant and fuel) are preheated to through recovery of heat from flue gas produced by the combustion reactants through utilization of a radiative recuperator with a reduced risk of catastrophic safety failure from direct contact of the preheated combustion reactant and the flue gas.

More specifically, the oxidant and fuel, including the preheated oxidant and/or preheated fuel, are combusted by one or more burners mounted in a furnace, thereby producing a flow of hot flue gas. The flow of hot flue gas is enclosed by a duct for the evacuation of the hot flue gas from the furnace.

On one or more sides of, or surrounding, the duct is an insulating wall made of refractory insulation. In the case of an insulating wall surrounding the duct, a non-reactive gas space (optionally in fluid communication with ambient air) is disposed between an outer surface of the duct and an inner surface of the insulating wall. In the case of an insulating wall on one or more sides of the duct, one or more corresponding non-reactive gas spaces (optionally in fluid communication with ambient air) is (are) disposed between an outer surface of the duct and an inner surface of the corresponding insulating wall(s). A non-limiting list of types of non-reactive gases includes air, carbon dioxide, water vapor and/or nitrogen.

In either case, a plurality of metallic pipes extends through the non-reactive gas space(s) and contains flows of gaseous fuel or oxygen-rich oxidant to be preheated. Heat from the hot flue gas is radiatively transferred (and to a lesser degree is convectively transferred) to the duct. As a primary radiation medium, heat from the duct is radiatively transferred across the non-reactive gas space(s) to the metallic pipes. Heat is also radiatively transferred across the non-reactive gas space(s) to the insulating walls, which act as a secondary radiation medium by radiating the heat back to the metallic pipes. In order to enhance the heat transfer, one or more portions of the duct opposite the metallic pipes and the insulating wall, i.e. bordering an non-reactive gas space, is comprised of a material that exhibits a thermal conductivity of more than 1 W/(m·K), preferably more than 3 W/(m·K). The material that exhibits a thermal conductivity of more than 1 W/(m·K) and preferably of more than material that exhibits a thermal conductivity of more than 3 W/(m·K), may be a ceramic or a metallic material. One of ordinary skill in the art will recognize that such a thermal conductivity is significantly higher than that of conventional refractory insulation materials used to construct or surround. flue gas ducts and to prevent overheating the environment around the flue gas duct. The heat radiated across the non-reactive gas space from the duct and the insulating walls to the metallic pipes is in turn convectively transferred to the flows of the gaseous fuel or oxygen-rich oxidant contained within the pipes. By one or more portions, we mean that the entirety of the duct may be comprised of the material having a thermal conductivity of more than 1 W/(m·K) or less than the entirety of the duct may be comprised of the material having a thermal conductivity of more than 1 W/(m·K). The advantages of a duct having only one or more portions (and not the entirety) comprised of such a material will be described below.

In contrast to the combustion reactant preheating technique of U.S. Pat. No. 6,250,916 (utilizing a fan to create a flow of cold air for preheating at a metallic recuperator and use as an intermediate heat exchange fluid), no blower, fan, booster, compressor or similar equipment for moving air is present for the purpose of forcing a flow of air across the metallic pipes in the non-reactive gas space(s) for achieving optimized convective heat transfer between the heated air and the metallic pipes. Rather, the air is ordinarily static in the inventive heat transfer technique and optionally is allowed to flow in and out of the space contained by the duct and refractory insulation. Indeed, if the ambient air enters the non-reactive gas space from a relatively lower height and heated air is allowed to exit the non-reactive gas space from a relatively higher height, a natural draft may be created due to the rise in buoyancy of the air after it is heated within the non-reactive gas space. Thus, one of ordinary skill in the art will recognize that the air of the inventive heat transfer technique is not ordinarily used as a heat exchange medium for convective heat transfer. Nevertheless, a blower or fan may optionally be used to force a flow of air into and out of the non-reactive gas space for the purpose of purging the non-reactive gas space(s) in case a leak of combustion oxidant or combustion fuel into the non-reactive gas space (s) is detected or is otherwise believed to be present. Similarly, a blower or fan may be optionally used to force a flow of air into and out of the non-reactive gas space in case the metallic pipes need to be cooled in the event of a process temperature upset. In either of these two cases, one of ordinary skill in the art will recognize that the routine use of such a blower or fan is not for the purpose of effecting convective heat transfer between the duct and metallic pipes by using the air in the non-reactive gas space(s) as a heat exchange medium. Also, the The flue gas is produced in a furnace that includes a combustion space enclosed by a furnace wall in which are mounted one or more burners. The burners inject the preheated fuel and/or preheated oxidant into the combustion space where they are combusted to produce the flue gas. Since oxidant and/or fuel is preheated, less fuel need be combusted in order to produce an equivalent amount of heat within the furnace. The burners may inject non-preheated fuel and preheated oxidant, preheated fuel and non-preheated oxidant, or both preheated fuel and preheated oxidant. In the case of a melting furnace, one to eighteen burners are typically present. More particularly, as many as eighteen burners are typically present in a relatively larger glass melting furnace and 2 burners are typically present in an end port type glass furnace.

In the case of a preheated fuel (that is preheated in the metallic pipes of the recuperator of the invention), it is gaseous, such as natural gas, biogas, coal gas, syngas, or low calorific gas. For fuels that are not preheated in the metallic pipes of the recuperator of the invention, such fuels may be ambient temperature or preheated by a different technique and include solid fuels (such as coal, petcoke, biomass, or waste), liquid fuels (such as fuel oil), and gaseous fuels (such as natural gas, biogas, coal gas, syngas, or low calorific gas).

In the case of an oxidant preheated in the metallic pipes of the recuperator of the invention, it has an oxygen content higher than that of air, such as oxygen-enriched air, industrially pure oxygen, a mixture of industrially pure oxygen and recirculated flue gas, or a mixture of industrially pure oxygen and carbon dioxide. The oxygen-enriched air is typically derived through mixing air with industrially pure oxygen or through mixing industrially pure oxygen with industrially pure nitrogen. The industrially pure oxygen is oxygen that is obtained from a cryogenic air separation unit, a vapor swing adsorption (VSA) unit, or a vaporizer fed with liquid oxygen from a liquid oxygen tank. The selection of the specific type of oxygen source will depend upon the flow rate required by the burners for the furnace at hand. Typically, the overall oxygen content of the totality of all oxidants injected by the burner(s) of the furnace is at least 24%, more particularly, at least 29%. For oxidants (combusted by the burner or by one or more of the burners of the furnace) that are not preheated in the metallic pipes of the recuperator of the invention, such oxidants may be ambient temperature or preheated by a different technique and include air, oxygen-enriched air, industrially pure oxygen, a mixture of industrially pure oxygen and recirculated flue gas, or a mixture of industrially pure oxygen and carbon dioxide as described above.

The flue gas is discharged from the combustion space towards a ceramic or alloy duct where its thermal energy is used to preheat the fuel or oxidant as described above. The flue gas may be received directly into the duct from the combustion space or the flue gas may traverse an intermediate conduit fluidly communicating between the combustion space and the interior of the duct. The flue gas is typically at a temperature of 600° C.-1,550° C. While it is mainly comprised of $CO_2$, moisture, and $N_2$, it may include corrosive materials such as alkali vapors produced by glass furnaces or corrosive substances produced by metal melting furnaces, Corrosion of the furnace may occur when such vapors condense on furnace surfaces. One of ordinary skill in the art will understand that such alkali vapors typically include NaOH and KOH. As summarized by Kobayashi, reactions of the alkali vapors with silica brick (especially the wollastonite binder) in the furnace crown. Kobayashi, et al. "TCF Technology for Oxy-Fuel Glassmelting" (Part One), American Ceramic Society Bulletin, Vol. 84, No. 2 (February, 2005). The flue gas may also contain an amount of non-combusted fuel.

The flue gas produced in the combustion space is received at one end of the duct and discharged at an opposite end of the duct. The cross-section of the duct may be configured as any regular geometric shape, including but not limited to a circle, an oval, a rectangle, and a square.

As mentioned above, the one or more portions of the duct opposite metallic pipes and an insulating wall are comprised of a material having a thermal conductivity of more than 1 W/(m·K), preferably more than 3 W/(m·K). Suitable materials include ceramics and metal alloys. In the present context, the term "ceramic" is used in the broad sense and refers to non-metallic inorganic solids which remain in the solid state and do not soften or melt when heated at the temperatures occurring in the furnace. The term "ceramic material" as used herein thus also includes ceramics in the narrow sense, i.e.; non-metallic inorganic solids which have been subjected to high temperatures (such as, for example, above 1100° C.)—also referred to as firing—during manufacture and which, once manufactured, remain in the solid state and do not soften or melt when heated at the temperatures occurring in the furnace. One of ordinary skill in the art will recognize that such materials include refractories given that refractories are primarily made out of ceramics such as aluminas, silicates, silicon carbide, zirconias, etc. Particularly suitable ceramics include castable refractories and fused cast refractories having a relatively high SiC content (such as at least 30% or at least 70%) or sintered ceramics such as nitride bonded SiC. Other suitable ceramic materials include but are not limited to fused cast alumina, fused cast alumina-zirconia-silicates. Suitable metal alloys include, but are not limited to Kanthal and high Ni—Cr content such as 310ss, Incoloy 800/825 and Inconel 600/625.

The relatively high thermal conductivity allows heat to be satisfactorily transferred, via radiative heat transfer, between the portion and the metallic pipes and between the portion and the insulating wall, and by convective heat transfer between the metallic pipes and the combustion reactant flowing through the metallic pipes. As mentioned above, the entirety of the duct need not be made of the ceramic or metallic material having the specified minimum thermal conductivity. Rather, some portions of the duct may be comprised of a material having a thermal conductivity greater than 1 W/(m·K) while remaining portions of the duct, and in particular those that do not face the metallic pipes or which are not adjacent to the metallic pipes, may be made of a material having a thermal conductivity of equal to or less than 1 W/(m·K). Portions of the duct comprised of materials having a thermal conductivity equal to or less than 1 W/(m·K) may also be disposed in very high temperature (i.e., 1250° C. or greater) areas of the duct because the increased heat radiation at such high temperatures can help offset the relatively lower conductivity. This may be advantageous if the remaining portions of the duct comprised of a material having a thermal conductivity equal to or less than 1 W/(m·K) is less expensive than the higher thermal conductivity material (i.e., greater than 1 W/(m·K)) or has some other advantage in comparison to the higher thermal conductivity material. As one concrete example, if only a relatively short length of the metallic pipes need be in radiative heat transfer relationship with the duct in order to sufficiently preheat the oxidant or fuel, only those portions of the duct that face the relatively short length need be made of the material having the required thermal conductivity. This way, remaining portions of the duct that are not in radiative heat transfer relationship with the metallic pipes need not be made of the material having the required thermal conductivity. Additionally, if portions of the duct that are not opposite the metallic pipe(s) are made of a material having a thermal conductivity of less than 1 W/(m·K), such a material will help avoid overheating of the surroundings of the duct. Thus, such a configuration would be relatively safer.

While the material of the portions of the duct which have the required thermal conductivity is not limited to ceramics, compared to metal alloys, ceramics have the following advantages. Those skilled in the art of recuperative heat exchange will recognize that the resistance to corrosion exhibited by ceramic materials can be significantly superior to a wide variety of metals. This is important because, if the portion with a thermal conductivity of more than 1 W/(m·K) duct was instead comprised of a metallic material, it would generally be likely to be rendered porous at a much higher rate. This would inevitably lead to premature development of a flow of flue gas to the interior of the air gap and corrosive attack on the metallic pipes conveying the combustion reactant. If the pipes are similarly corroded, through contact with the corrosive and high temperature flue gas, to the point of rendering them non-gas tight, the risk of a catastrophic safety failure is enhanced. A catastrophic safety failure may occur when the high temperature (through preheating) fuel is combusted in an uncontrolled manner between the duct and metallic pipes or within the duct with any residual oxygen present in the flue gas. A catastrophic safety failure may also occur when the high temperature (through preheating) oxidant is combusted in an uncontrolled manner between the duct and metallic pipes or within the duct with any non-combusted or incompletely combusted fuel present in the flue gas. Again, if the portion with a thermal conductivity of more than 1 W/(m·K) was comprised of a metallic material instead of a ceramic material, while such a metallic portion could be replaced frequently in order to avoid such the aforementioned safety failure, this represents a disruption to the process and is relatively costly. Furthermore, while some metals exhibit some degree of resistance to corrosion, such as Hastelloy, such metals are generally significantly more expensive than other metals ordinarily used in recuperative heat exchangers. In contrast to portions with a thermal conductivity of more than 1 W/(m·K) made of a metallic material, the relatively greater corrosion resistance exhibited by many ceramic materials allows the duct to be used for a relatively long time before replacement of the portion with a thermal conductivity of more than 1 W/(m·K). Indeed, based upon the well-established resistance to high temperature, corrosive environments exhibited by most ceramic materials in contrast to most metallic materials, we believe that the useful lifetime of the ceramic portion with a thermal conductivity of more than 1 W/(m·K) will be multiples of the useful lifetime of one hypothetically made of a metallic material.

On the other hand, metallic alloys exhibit some advantages not ordinarily exhibited by ceramics. Metal alloys are less expensive than many ceramic materials. Metal alloys are easier to fabricate because they may be easily shaped or bent. Ducts made of metal alloys are easier to mate with other components that are also metal. In comparison to ceramics, metal alloys exhibit a lower risk of breakage during handling, and thus, make for easier handling during construction of the duct.

The outer diameter (OD), inner diameter (ID), and wall thickness of the portion with a thermal conductivity of more than 1 W/(m·K) will depend upon the flow rate and temperature of flue gas, flow rate of combustion reactant, and the temperature to which the combustion reactant is desired to be preheated to. In order to maintain a satisfactory mechanical integrity of the duct, the wall thickness is typically about 1-10 cm.

A plurality of metallic pipes are arranged around the duct with gaps in between both the portion with a thermal conductivity of more than 1 W/(m·K) and the pipes, between each of the pipes, and between the pipes and the corresponding insulating wall(s). The metallic pipes convey the combustion reactant through the recuperative heat exchange portion of the system where they are preheated through heat transfer with the flue gas. The pipes are made of a metallic material where non-limiting examples include 304 stainless steel, 310 stainless steel, nickel alloys, and any of the Inconel series (such as 600 or 625). The pipes are gas-tight. By this, we mean that the pipes do not allow the non-reactive gas from outside the pipes to leak into the interior of the pipes to mix with the combustion reactant or allow the combustion reactant to leak out of the pipes to mix with the non-reactive gas outside the pipes. The flows of preheated oxidant (or fuel) from all of the pipes may be combined to provide a single preheated flow of oxidant (or fuel). Alternatively, the individual flows of preheated oxidant (or fuel) may be kept separate and uncombined. In yet another alternative, flows of preheated oxidant (or fuel) from two or more of the pipes (but from less than all of the pipes) may be combined. The OD, inner diameter ID, and wall thickness of the pipes will depend upon the number of pipes utilized for a given flow rate and temperature of flue gas, the temperature to which the combustion reactant is desired to be preheated to, and the OD, ID, and wall thickness of the portion with a thermal conductivity of more than 1 W/(m·K).

As discussed above, the metallic pipes and the ceramic or metallic portion with a thermal conductivity of more than 1 W/(m·K) may be surrounded by an insulating wall, which serves as a secondary radiation medium. In this case, while the cross-section of the insulating wall is typically the same regular geometric shape as that of the portion with a thermal conductivity of more than 1 W/(m·K), it need not be. In this same case, typically the cross-section of both of the insulating wall and the portion with a thermal conductivity of more than 1 W/(m·K) is configured as a square, as a rectangle or as a circle.

Also as discussed above, there may be two or more insulating walls each one of which is disposed on a respective side of the duct with an associated non-reactive gas space (through which one or more of the plurality pipes extend) disposed between a given pair of an insulating wall and respective duct side comprising a portion with a thermal conductivity of more than 1 W/(m·K). This embodiment offers the advantage of easier maintenance and continuous furnace operation in case less than all of the metallic pipes or as few as one of the metallic pipes need to be replaced or repaired. Instead of having to stop operation of the furnace and remove an insulating wall surrounding all of the metallic pipes just to remove or replace one of or less than all of the pipes, only the insulating wall adjacent to the specific metallic pipe(s) needing repair or replacement need be removed. In this manner, the other insulating walls may remain in place and the furnace operation need not be stopped. One of ordinary skill in the art will recognize that there may be many permutations of the aforementioned embodiment. For example, the duct may have a square cross-sectional configuration having four sides, where one insulating wall is disposed in spaced relationship with one of the sides and one or more of the metallic pipes extend through a respective non-reactive gas space between the associated insulating wall/duct side. As another example, the duct may have a square cross-sectional configuration having four sides, where a first insulating wall is disposed adjacent to and spaced from a first of the sides and one or more of the metallic pipes extend through a first non-reactive gas space between the first insulating wall and first side, a second insulating wall is disposed adjacent to and spaced from a second of the sides and one or more of the metallic pipes extend through a second non-reactive gas space between the second insulating wall and second side, a third insulating wall is disposed adjacent to and spaced from a third of the sides and one or more of the metallic pipes extend through a third non-reactive gas space between the third insulating wall and third side, and a fourth insulating wall is disposed adjacent to and spaced from a fourth of the sides and one or more of the metallic pipes extend through a fourth non-reactive gas space between the fourth insulating wall and fourth side, One of ordinary skill in the art will further recognize that only two or only three of the duct sides may have associated insulating walls disposed adjacent to them in spaced relationship.

For safety reasons, the outer wall is comprised of an insulating material, so that thermal energy will not be lost and equipment, processes, and persons exterior to the outer wall are not exposed to high temperature environments. The OD, ID, thickness, and material of construction of the outer wall will depend upon the temperature and flow rate of the flue gas through the duct and the amount of heat transferred to the combustion reactant. Typically, the distance between the outer surface of the duct and the inner surface of the insulation is 10 cm or less.

The heat transfer process works as follows. Heat is transferred from the flue gas to the duct largely by radiative heat transfer. Acting as a radiative heat medium, the portion with a thermal conductivity of more than 1 W/(m·K) of the duct then transfers heat to the metallic pipes largely by radiative heat transfer across the non-reactive gas space(s) between the duct and the pipes. Heat is also transferred from the duct to the insulating walls by radiative heat transfer across the non-reactive gas space(s) between the duct and the insulating walls. Also acting as a radiative heat medium, the insulating walls then radiate heat back to the metallic pipes. Finally, heat is transferred from the pipes to the combustion reactant (either oxygen-rich oxidant or gaseous fuel) largely by convective heat transfer.

The aforementioned heat transfer technique may be distinguished from conventional heat transfer methods in the field of the invention, such as that of U.S. Pat. No. 9,618,203.

Figure 15A:
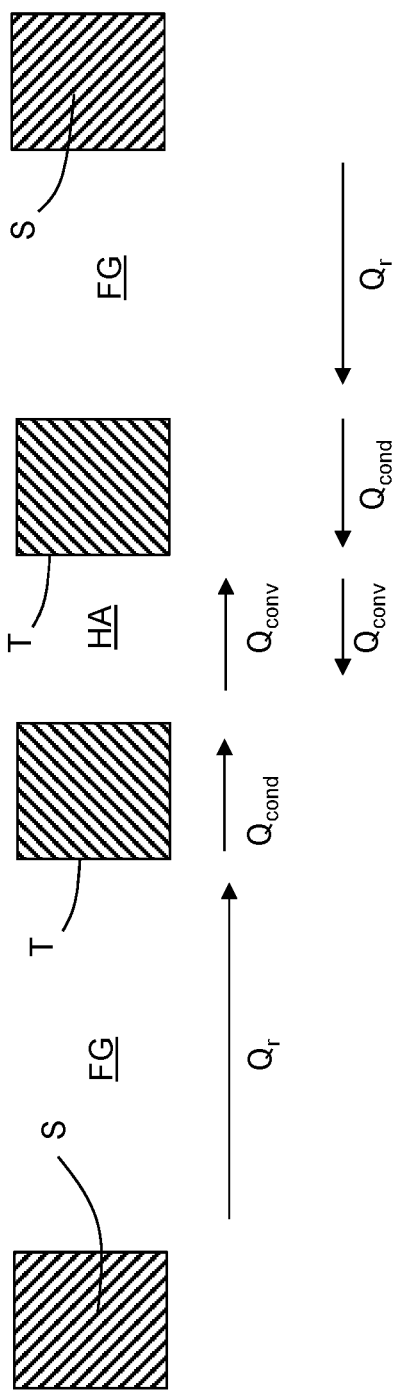
FIG. 15A is a schematic of heat flows for conventional heat transfer methods.

In convention heat transfer methods and as best shown in FIG. 15A, heat is transferred by radiation ($Q_r$) from flue gas FG to a tube T made of metal. Heat is then transferred across the width of the tube T by conduction ($Q_{cond}$). Heat is then transferred to air HA for preheating by convection ($Q_{conv}$). Heat leaks are reduced by placement of insulation I.

Figure 15B:
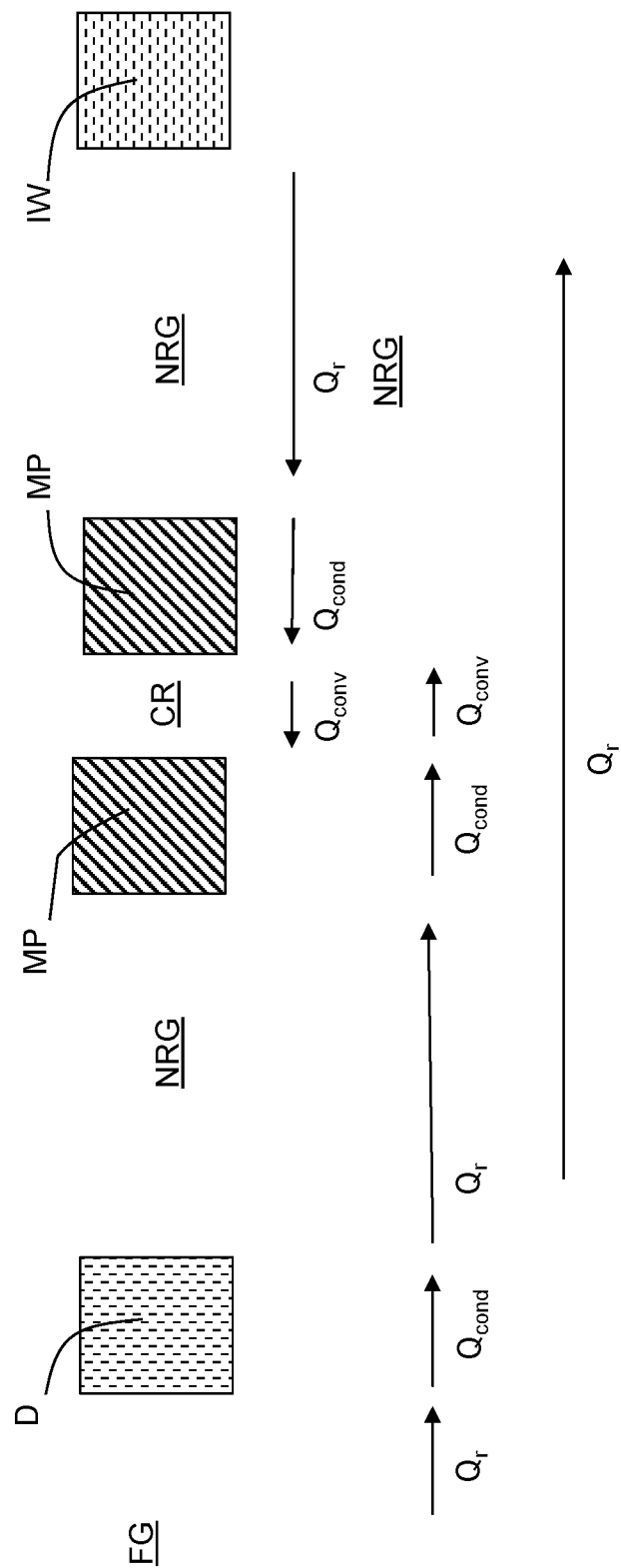
FIG. 15B is a schematic of heat flows for an illustrative example of the invention.

In the invention and as best shown in FIG. 15B, heat is transferred from flue gas FG to a duct D (at least portions of which have a thermal conductivity greater than 1 W/(m·K)) by radiation ($Q_r$). Heat is then transferred across a width of the duct D by conduction ($Q_{cond}$). Heat is then transferred from the duct D across the non-reactive gas space NRG to a metallic pipe MP by radiation ($Q_r$). Heat is then transferred across the wall of the metallic pipe MP by conduction ($Q_{cond}$) and thenceforth to the combustion reactant CR flowing through the metallic pipe MP by convection ($Q_{conv}$). Because the metallic pipes MP do not completely block the path from the duct D to the insulating wall IW, heat is also transferred from the duct D to the insulating wall by radiation ($Q_r$). Heat is therefore also transferred from the insulating wall across the non-reactive gas space NRG to the other wall of the metallic pipe MP by radiation ($Q_r$). Heat is subsequently transferred across the width of that metallic pipe MP wall by conduction ($Q_{cond}$) and thenceforth to the combustion reactant CR by convection ($Q_{conv}$).

When presented with the technique of U.S. Pat. No. 9,618,203, one of ordinary skill in the art would have considered it disadvantageous to include a duct in between the flue gas FG and the tube T. This is because inclusion of a duct would have significantly decreased the efficiency of heat transfer from the flue gas FG to the air for preheating HA. In the invention, because there is an abundance of thermal energy in the flue gas FG available for ultimate transfer to the combustion reactant CR and there is an increased concern for safety, the significant decrease in the efficiency of heat transfer from the flue gas FG ultimately to the combustion reactant CR is considered acceptable.

We will now discuss several structural embodiments of the novel furnace and recuperator.

Figure 4:
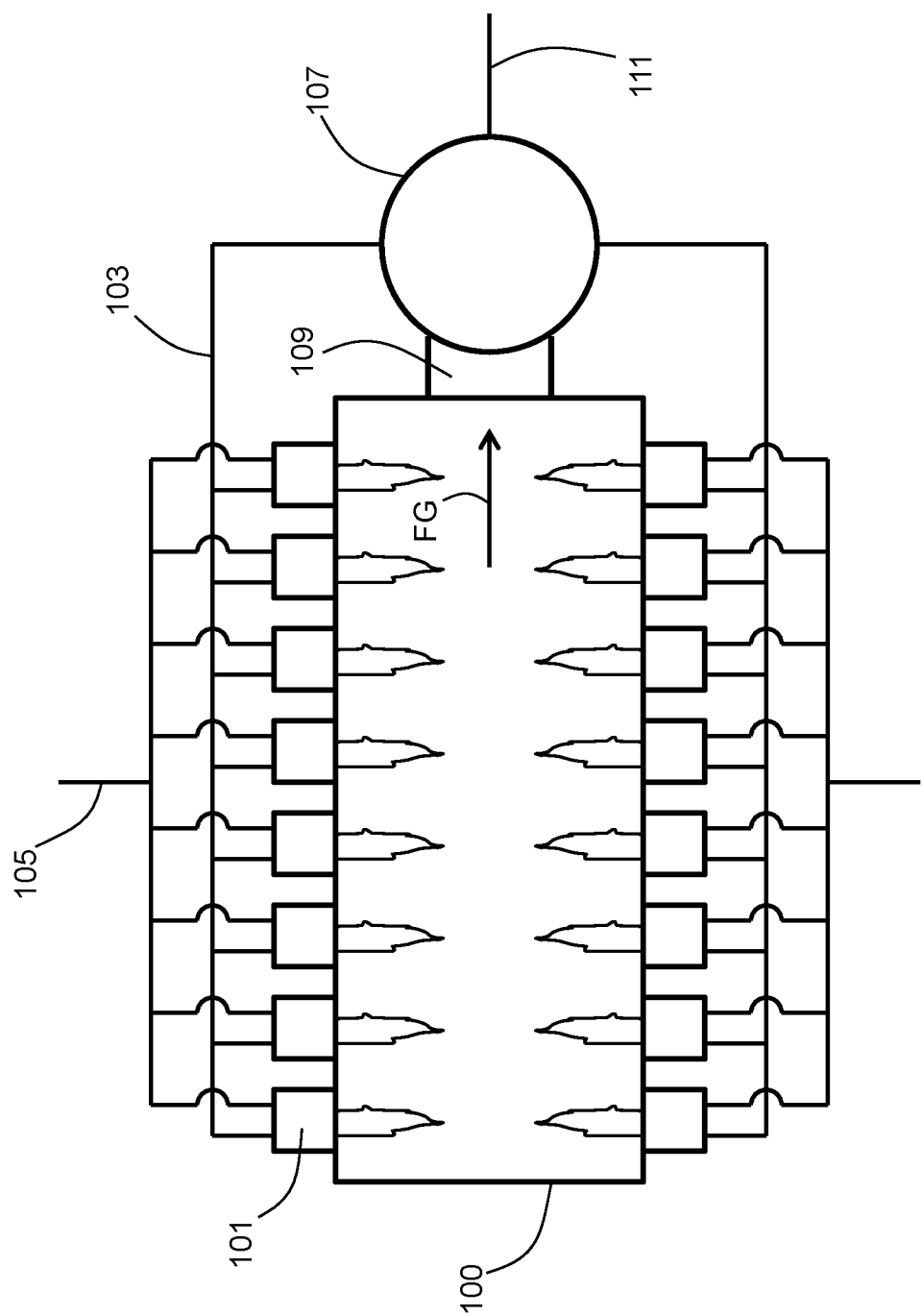
FIG. 4 is a top plan view schematic of an embodiment of the novel furnace utilizing preheated oxygen or preheated fuel.

As best shown in FIG. 4, flows of the first combustion reactant 105 such as oxygen-rich oxidant (or gaseous fuel) and a second, preheated, combustion reactant 103 such as gaseous fuel (or oxygen-rich oxidant) are split into multiple sub-flows and received by a plurality of burners 101 mounted in a wall of a furnace 100. The combustion reactants are combusted by the burners 101 inside a combustion space within the furnace 100 to produce a flow of flue gas FG. The flow of flue gas is conveyed towards a recuperator 107 (optionally via a conduit 109) where heat is transferred from the relatively higher temperature flue gas FG with relatively lower temperature (such as ambient) flow of the non-preheated, second, combustion reactant 109, thus producing the flow of the second, preheated, combustion reactant 103. One of ordinary skill in the art will recognize that, when the first combustion reactant 105 is oxygen-rich oxidant, the second combustion reactant 109 is gaseous fuel. Such a one will also recognize that, when the first combustion reactant 105 is fuel, the second combustion reactant 109 is oxygen-enriched oxidant. Such a one will further recognize that the flow of the first combustion reactant 105 may also be preheated at the recuperator 107 before being introduced to the burners 101 in the same manner as the flow of the second combustion reactant 109. This may be performed in the same recuperator 107 or in a second, separate recuperator (not shown). Finally, in the case where the first combustion reactant 105 is fuel (which is not preheated in recuperator 107), it may optionally be preheated using any technique known in the field of combustion using preheated fuels.

Figure 5:
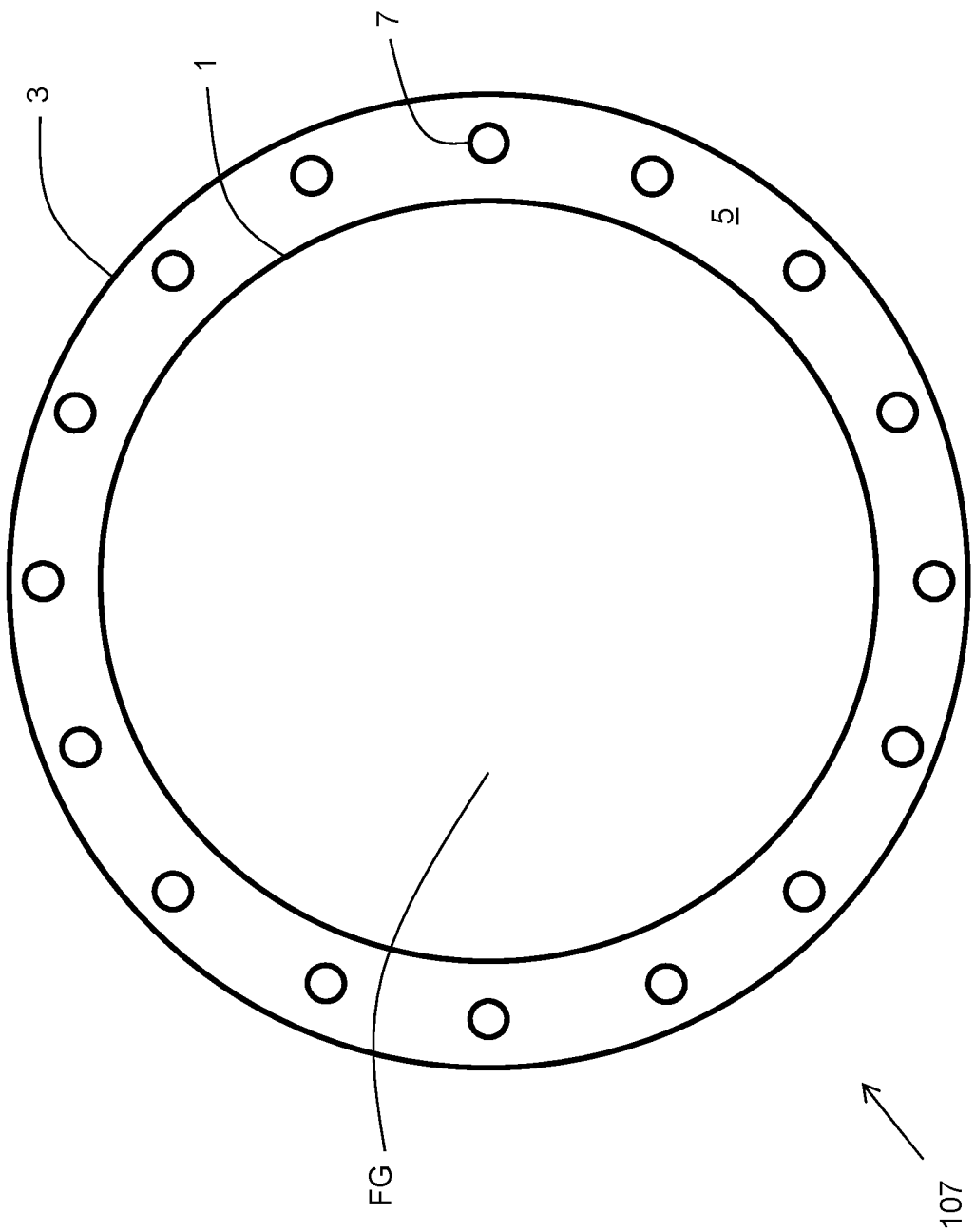
FIG. 5 is a top cross-sectional view schematic of one embodiment of the recuperator of the novel furnace.

As best illustrated in FIG. 5, the recuperator 107 includes a duct 1 made at least partially of a material in accordance with the above description that is surrounded by an insulating wall 3 in accordance with the above description. The duct 1 encloses a space FG through which the flue gas flows. An non-reactive gas space 5 is comprised of the annular space in between an inner surface of the insulating wall 3 and the duct 1. A plurality of metallic pipes 7 (conveying the combustion reactant to be preheated) extends through the non-reactive gas space 5. The insulating wall 3 is concentric with the portion 1 and both have a circular cross-sectional configuration. One of ordinary skill in the art will recognize that both the insulating wall 3 and duct 1 may have an oval cross-sectional configuration. The non-reactive gas space 5 need not be enclosed at a top and bottom of the recuperator 107 in which case air freely communicates between the ambient atmosphere and the non-reactive gas space 5. Alternatively, in order to provide more effective heat transfer from the duct 1 to the metallic pipes 7, at the top and bottom of the recuperator 107, the insulating wall 3 may extend over and under the non-reactive gas space 5 to thereby effectively enclose the non-reactive gas space 5 so that the non-reactive gas contained within is static (i.e., it ordinarily cannot exit the non-reactive gas space 5). Nevertheless, one or more openings (such as at the top and the bottom) may be formed in the insulating wall 3 to allow the ambient air to freely flow into and out of the non-reactive gas space 5. One of ordinary skill in the art will recognize that apertures may be formed in the top and bottom of the insulating wall 3 in order to allow the metallic pipes 7 to extend therethrough.

Figure 6:
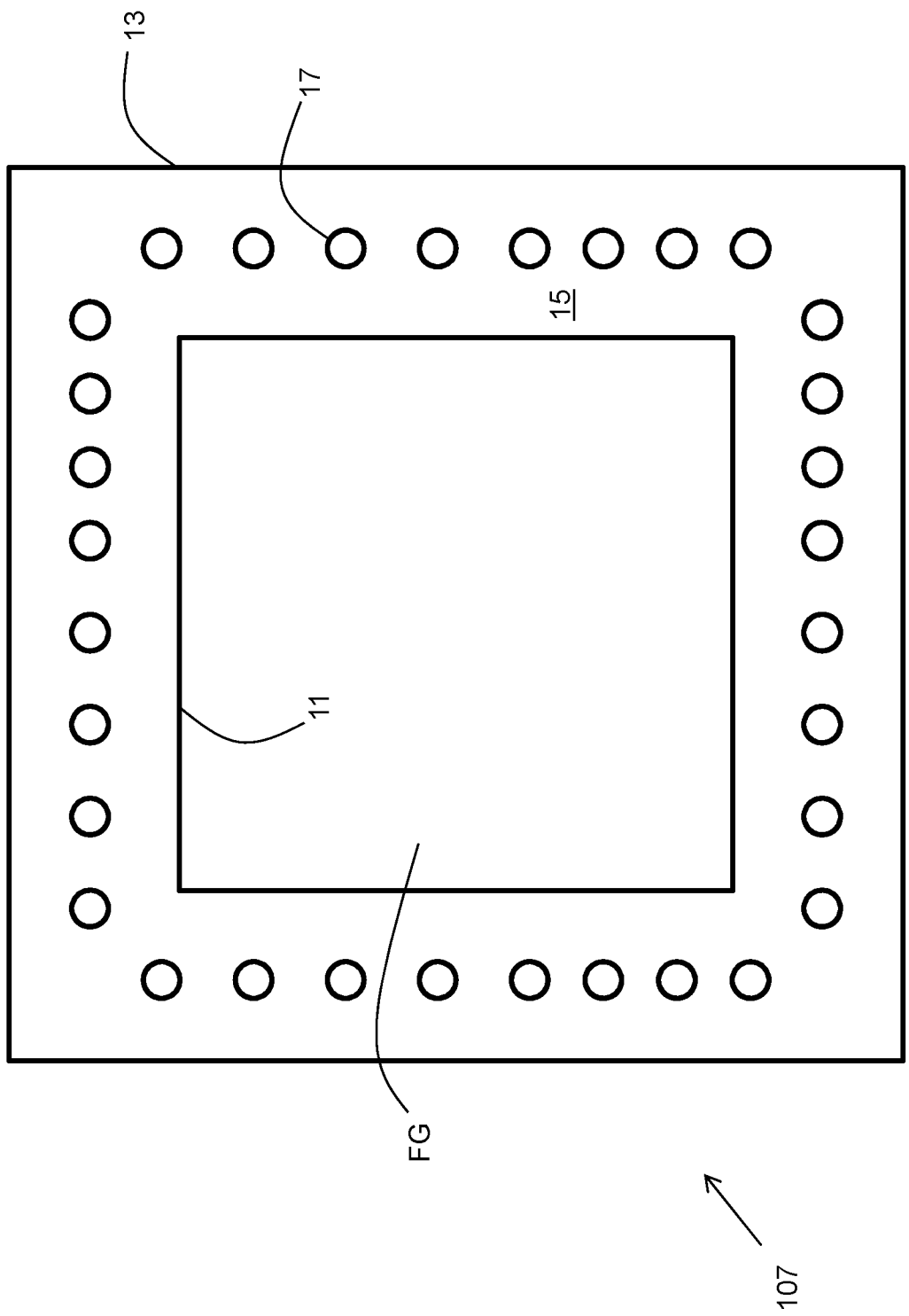
FIG. 6 is a top cross-sectional view schematic of another embodiment of the recuperator of the novel furnace.

As best shown in FIG. 6, the recuperator 107 includes a duct 11 made at least partially of a material in accordance with the above description that is surrounded by an insulating wall 13 in accordance with the above description. The duct 11 encloses a space FG through which the flue gas flows. An non-reactive gas space 15 is comprised of the space in between an inner surface of the insulating wall 13 and the duct 11. A plurality of metallic pipes 17 (conveying the combustion reactant to be preheated) extends through the non-reactive gas space 15. As each of the duct 11 and insulating wall 13 have four sides, the metallic pipes 17 are grouped into four sub-groups in order to more uniformly transfer heat from the hot flue gas flowing through the duct 11 to the combustion reactant flowing through the pipes 17. The insulating wall 13 is concentric with the duct 11 in that their cross-sectional configurations share a common center, but in contrast to the embodiment of FIG. 4, both have a square cross-sectional configuration. In this manner, each one of the four sides of the insulating wall 13 is parallel to the respective side of the duct 11 it is adjacent to. One of ordinary skill in the art will recognize that both the insulating wall 13 and duct 11 may have rectangular cross-sectional configuration. Similar to the embodiment of FIG. 5, the non-reactive gas space 15 need not be enclosed at a top and bottom of the recuperator 107 in which case air freely communicates between the ambient atmosphere and the non-reactive gas space 15. Alternatively, in order to provide more effective heat transfer from the duct 11 to the metallic pipes 17, at the top and bottom of the recuperator 107, the insulating wall 13 may extend over and under the non-reactive gas space 15 to thereby effectively enclose the non-reactive gas space 15 so that the non-reactive gas contained within is static (i.e., it ordinarily cannot exit the non-reactive gas space 15). Nevertheless, one or more openings (such as at the top and the bottom) may be formed in the insulating wall 13 to allow the ambient air to freely flow into and out of the non-reactive gas space 15. One of ordinary skill in the art will recognize that apertures may be formed in the top and bottom of the insulating wall 13 in order to allow the metallic pipes 17 to extend therethrough.

Figure 7:
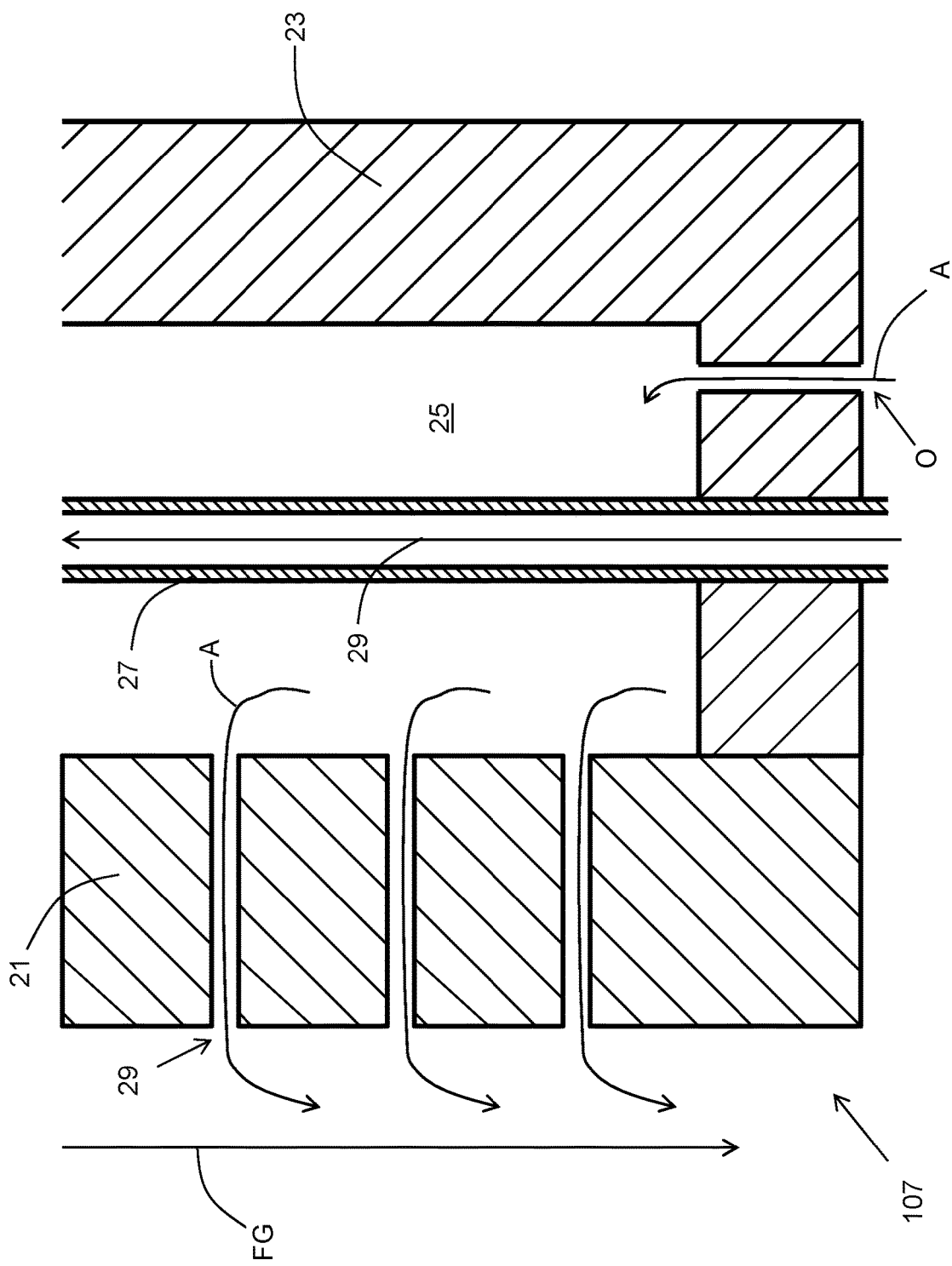
FIG. 7 is a side cross-sectional view schematic of another embodiment of the recuperator of the novel furnace.

As best illustrated in FIG. 7, the recuperator 107 includes a duct 21 made at least partially of a material in accordance with the above description and an insulating wall 23. A metallic pipe 27 (of a plurality of metallic pipes 27) extends through an non-reactive gas space 25 between the duct 21 and the insulating wall 23. Flue gas flows through the interior FG of the duct 21 while the flow of combustion reactant 29 flows through the metallic pipe 27. Similar to the variants described for the embodiments of FIGS. 5 and 6, one or more openings O may be formed in the bottom (and top) of the recuperator 107 in order to allow air A from the ambient atmosphere to freely flow into and out of the non-reactive gas space 25. Apertures 29 are also formed in the duct 21 to allow air to flow from the non-reactive gas space 25 to the interior 22 of the duct 21. A slight vacuum is formed by the fluid communication between the flow of flue gas and the air A in the non-reactive gas space 25 so that the air A flows through the apertures 29 from the non-reactive gas space 25 to the interior FG. More particularly, no mechanical device, such as a blower or fan, is continuously operated to force a flow of the air A through the non-reactive gas space (with the above-noted exceptions in mind).

Figure 8:
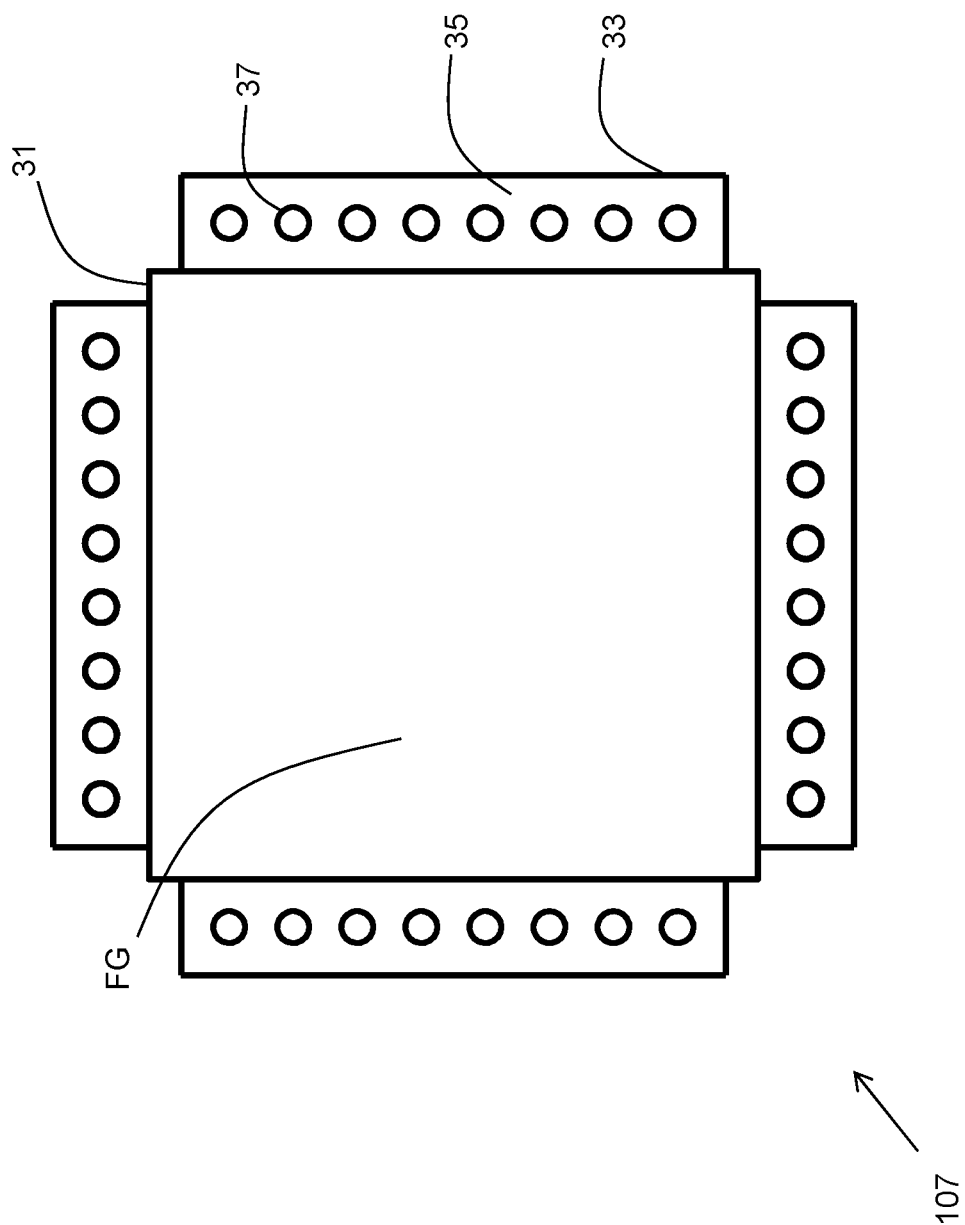
FIG. 8 is a top cross-sectional view schematic of yet another embodiment of the recuperator of the novel furnace.

As best shown in FIG. 8, the recuperator 107 includes a four-sided duct 31 having a square cross-sectional configuration. It also includes four insulating walls 33, each one of which is disposed adjacent to one of the four sides of the duct 31 in spaced relation. Between each pair of a side of the duct 31 and a respective insulating wall 3 is an associated non-reactive gas space 35. While the sides of the insulating walls 33 (adjacent to the four corners of the duct 31) are depicted in FIG. 8 as enclosed, one of ordinary skill in the art will recognize that they need not completely enclosed the non-reactive gas spaces 35. Each one of the four insulating walls 33 is parallel to a respective one of the four sides of the duct 11 to it is adjacent to.

In the configuration of FIG. 8, one of ordinary skill in the art will further recognize each pairing of an individual insulating wall 33 and a particular group of metallic pipes 37 is provided with its own chamber (containing the associated non-reactive gas space 35) that is defined by inner surfaces of the insulating wall 33 and the portion of the duct 31 that faces the pipes. Such a configuration may be used to more safely preheat different gases in different groups of the metallic pipes 37. For example, a first group of metallic pipes 37 may be used for preheating an oxidant while a second group of metallic pipes 37 may be used to preheat a fuel. Because the non-reactive gas space 35 associated with the first group of metallic pipes 37 is completely enclosed by the combination of the insulating wall 33 and the portion of the duct 31 facing that group of pipes 37, it is isolated from the non-reactive gas space associated with the second group of metallic pipes 37 (that is similarly completely enclosed by the combination of its own associated insulating wall 33 and the associated portion of the duct 31 facing that group of pipes 37). Thus, the risk that cross-contamination between different gases (such as an oxidant and a fuel) being preheated in different groups of metallic pipes is decreased in the event of failure of one of the metallic pipes 37. It should be noted that, each non-reactive gas space 35 need not be completely enclosed above and/or below the non-reactive gas space 35. Rather, each non-reactive gas space 35 may freely communicate with the ambient atmosphere. In this manner, while the risk of cross-contamination is decreased, the risk of a localized buildup of oxidant or fuel within a non-reactive gas space 35 is decreased because the non-reactive gas space 35 may be passively purged by the natural draft that is created by the heating of the non-reactive gas space 35 as described above.

Figure 9A:
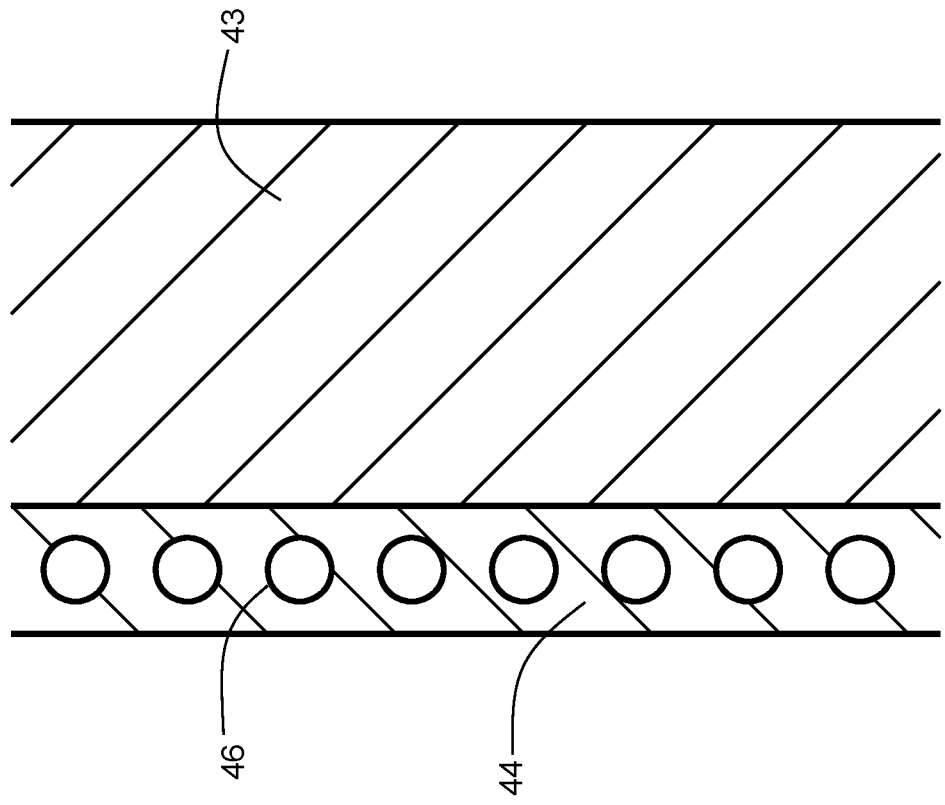
FIG. 9A is a side cross-sectional view schematic of a portion of yet another embodiment of the recuperator of the novel furnace.
Figure 9A:
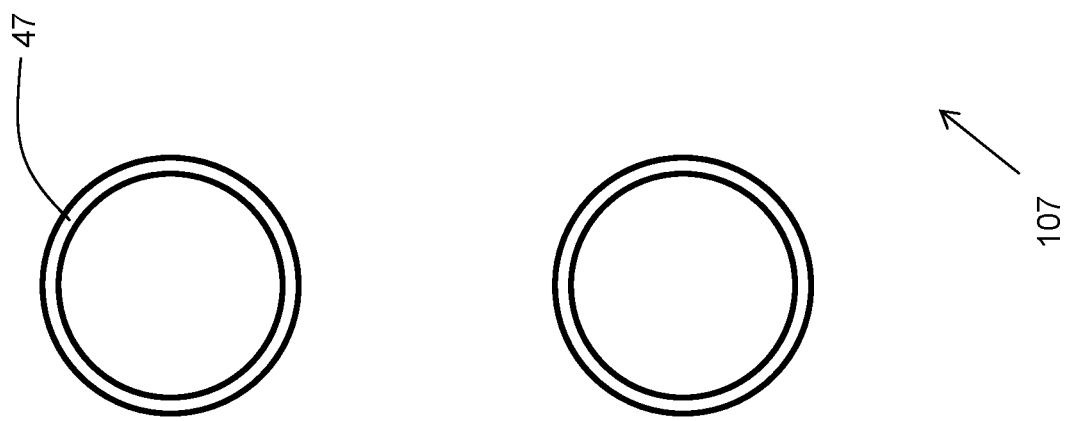

As best illustrated in FIG. 9A, the recuperator 107 includes an insulating wall 43 and metallic pipes 47 extending through an non-reactive gas space 45 between the insulating wall 43 and the duct (not illustrated in FIG. 9A). In contrast to the recuperators 107 depicted in other FIGS., a cooling panel 44 is provided along an inner surface of the insulating wall 43. The cooling panel 44 includes a plurality of cooling pipes 46 through which a cooling medium flows. An inwardly facing surface of the cooling panel 44 that faces the metallic pipes 47 may be provided with a high emissivity coating. In the foregoing manner, in the event that the temperature of the combustion reactant heated in the metallic pipes goes above a desired limit, the cooling medium flowing through the cooling pipes 46 in order to remove some of the heat that would otherwise be transferred to the insulating wall 43 and thus lower the temperature of the preheated combustion reactant.

Figure 9B:
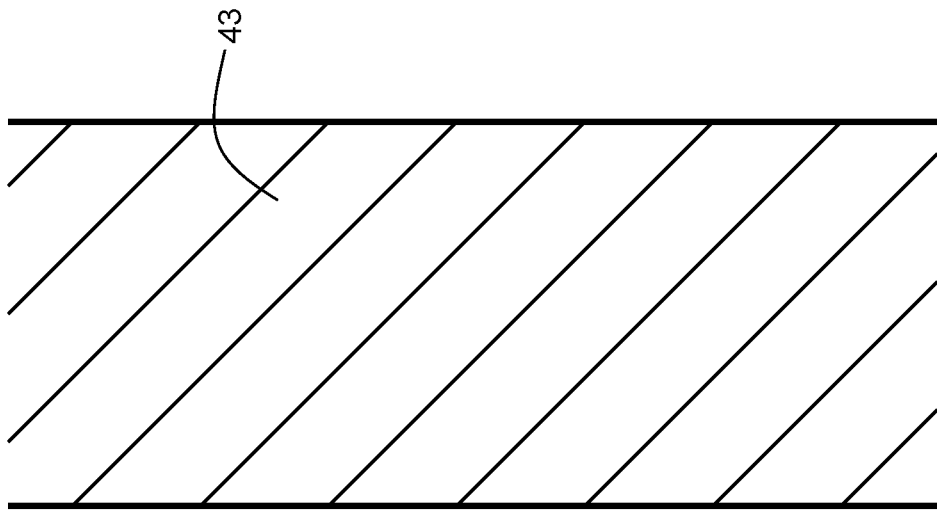
FIG. 9B is a side cross-sectional view schematic of a portion of another embodiment of the recuperator of the novel furnace.
Figure 9B:
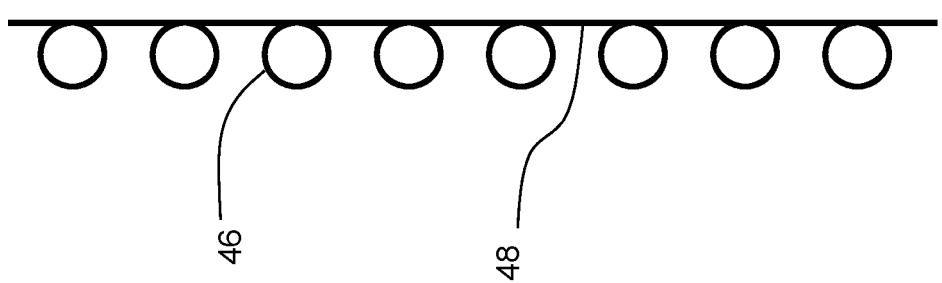
Figure 9B:
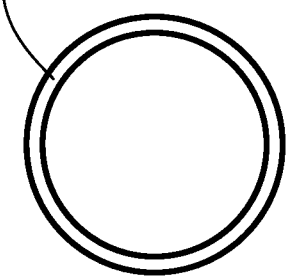
Figure 9B:
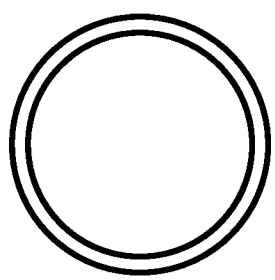

As best shown in FIG. 9B, the recuperator 107 includes an insulating wall 43 and metallic pipes 47 extending through a non-reactive gas space 45 between the insulating wall 43 and the duct (not illustrated in FIG. 9B). In contrast to the recuperators 107 depicted in other FIGS., a series of cooling pipes 46 is provided between the metallic pipes 47 and the insulating wall 43 through which a cooling medium flows. In the event that the temperature of the combustion reactant heated in the metallic pipes goes above a desired limit, the cooling medium flowing through the cooling pipes 46 cools the air in the non-reactive gas space between the duct and the insulating wall 43, which in turn cools the metallic pipes 47 and thus lowers the temperature of the preheated combustion reactant. The heat removal effect may be optionally improved by providing the series of cooling pipes 46 with a metallic plate 48, thereby increasing the surface area across which the cooling effect takes place.

Figure 9C:
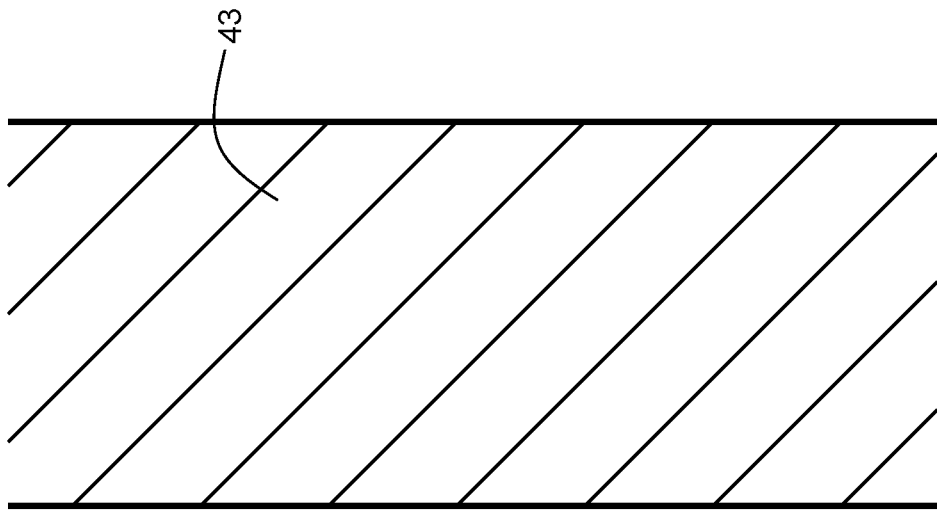
FIG. 9C is a side cross-sectional view schematic of a portion of another embodiment of the recuperator of the novel furnace.
Figure 9C:
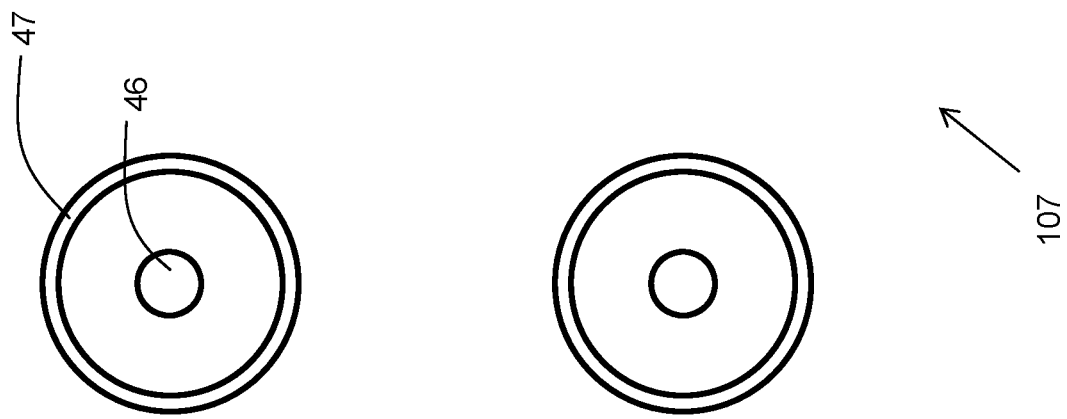

As best illustrated in FIG. 9C, the recuperator 107 includes an insulating wall 43 and metallic pipes 47 extending through a non-reactive gas space 45 between the insulating wall 43 and the duct (not illustrated in FIG. 9B). In contrast to the recuperators 107 depicted in other FIGS., an air cooling pipe 46 is provided within each metallic pipe 47. A cooling medium flows through the air cooling pipes 46 so that, in the event that the temperature of the combustion reactant heated in the metallic pipes goes above a desired limit, the cooling medium lowers the temperature of the preheated combustion reactant flowing through the metallic pipes 47.

Figure 9D:
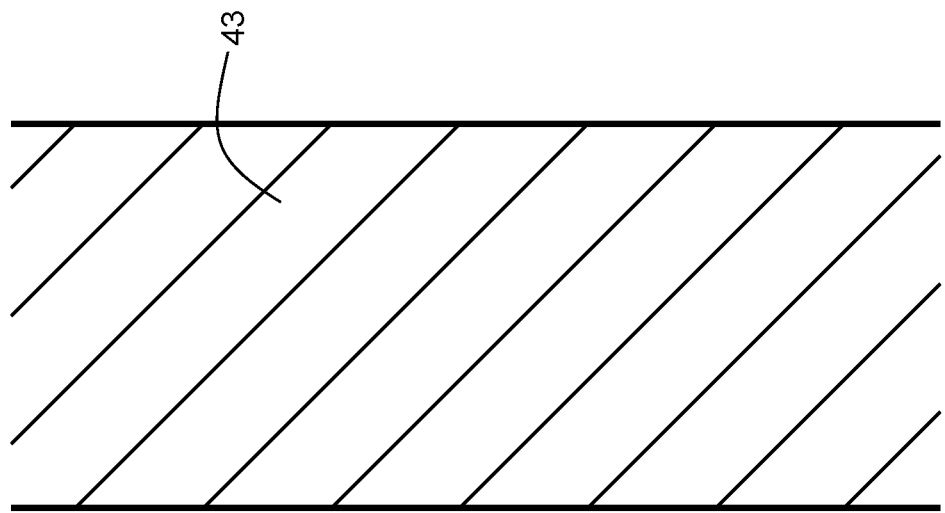
FIG. 9D is a side cross-sectional view schematic of a portion of another embodiment of the recuperator of the novel furnace.
Figure 9D:
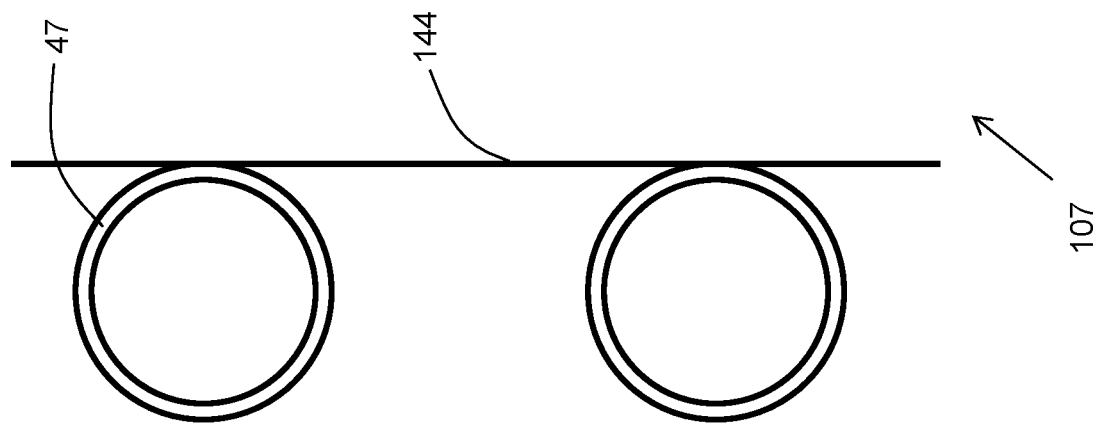

As best illustrated in FIG. 9D, the recuperator 107 includes an insulating wall 43 and metallic pipes 47 extending through a non-reactive gas space 45 between the insulating wall 43 and the duct (not illustrated in FIG. 9A). In contrast to the recuperators 107 depicted in other FIGS., a heat transfer panel 144 is provided along the metallic pipes 47. The heat transfer panel 144 is designed with a relatively large surface area so as to absorb significant amounts of heat radiated by the duct and the insulating wall 43 and subsequently transfer that heat to the metallic pipes 47 by conduction so as to enhance heating of the combustion reactant.

Figure 10:
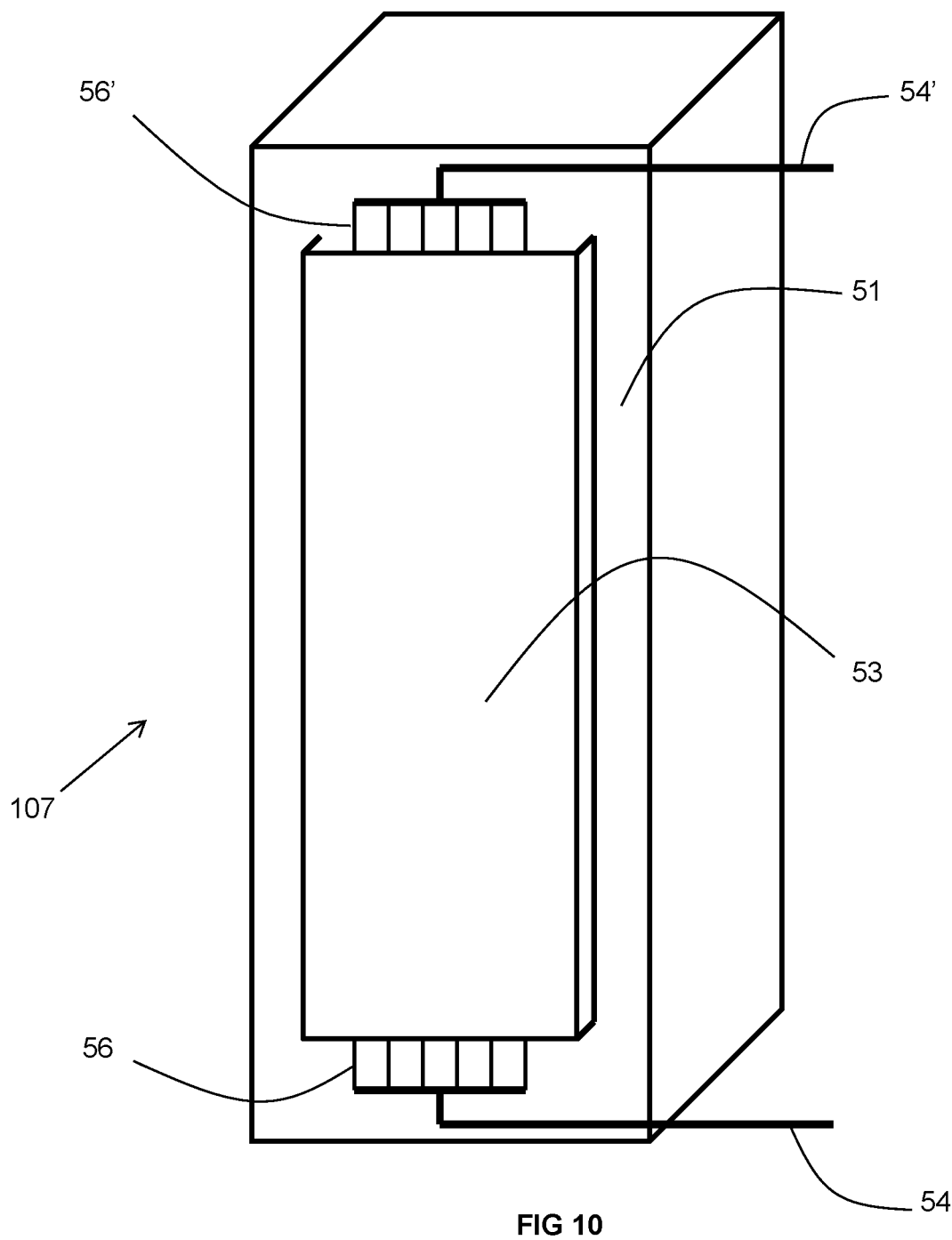
FIG. 10 is a perspective view schematic of the recuperator of FIG. 8.
Figure 11:
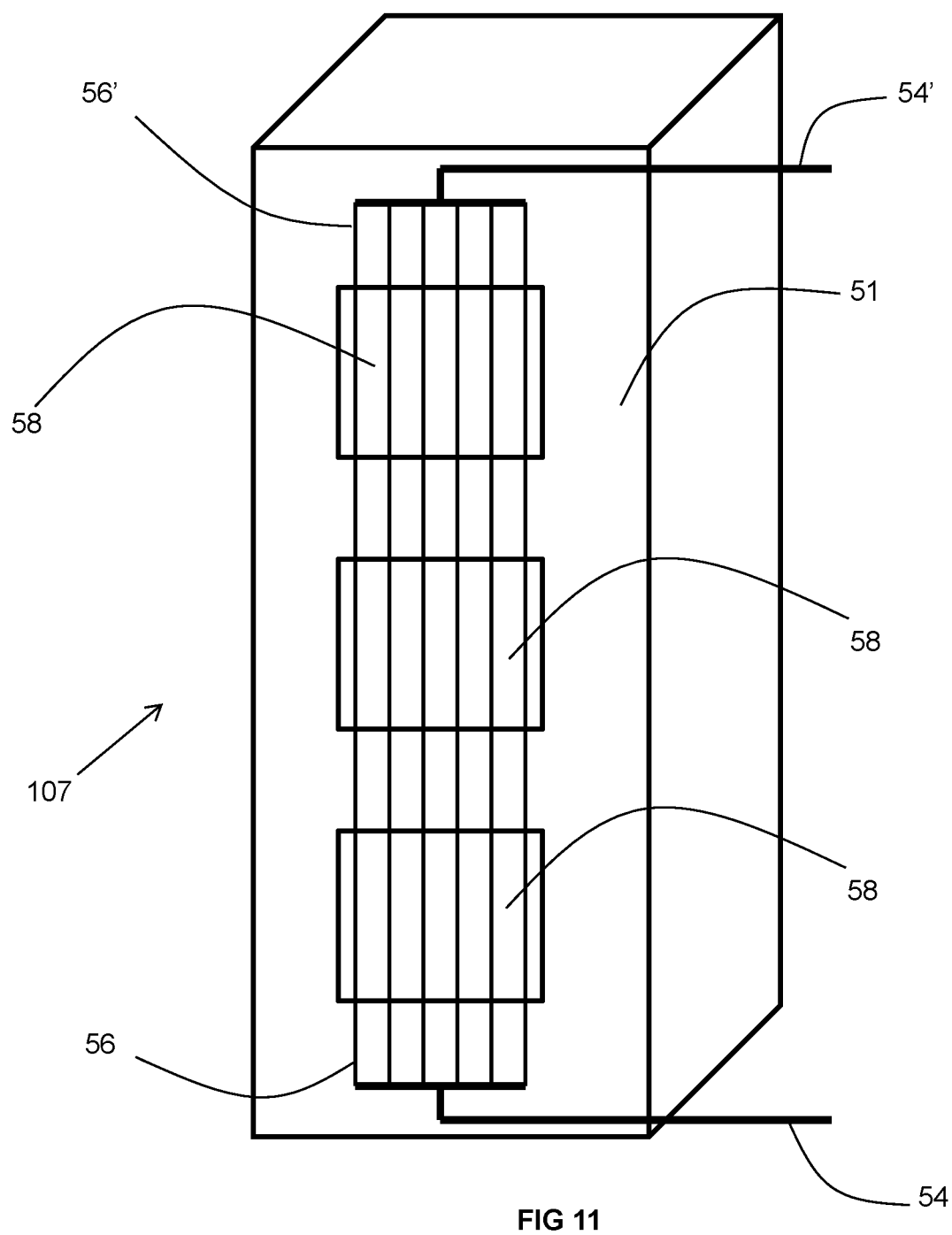
FIG. 11 is a perspective view schematic of the recuperator of FIG. 8 with parts removed.
Figure 12:
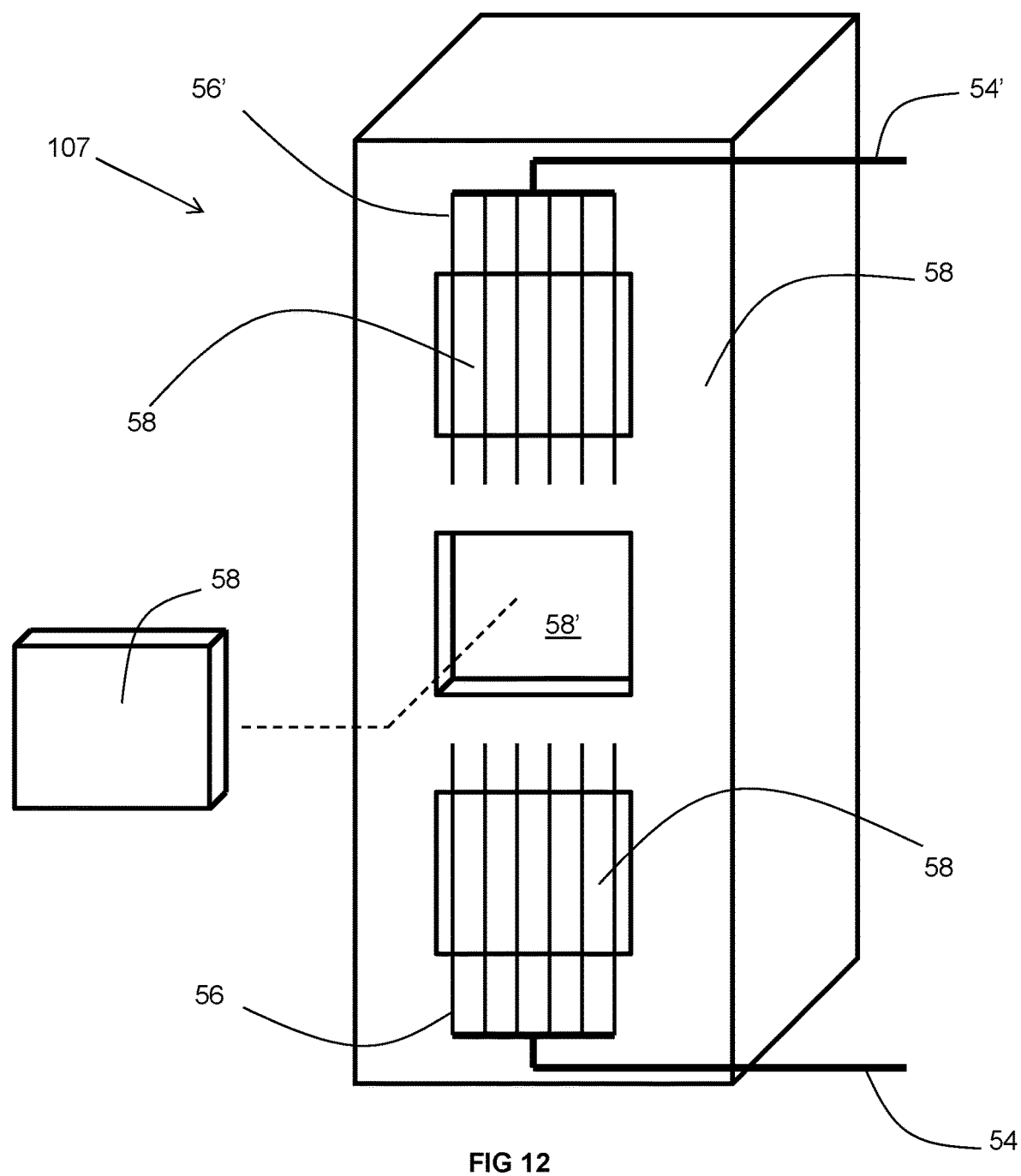
FIG. 12 is a perspective view schematic of the recuperator of FIG. 8 with parts removed.

As best shown in FIGS. 10-12, the recuperator 107 includes a ceramic or metallic duct 51 open at a top and bottom thereof so as to fluidly communicate with the interior of the furnace 100, optionally via the conduit 109, and with the conduit conveying the flow of the preheated combustion reactant 103. As will be explained in detail below, the duct 51 includes portions exhibiting a thermal conductivity of more than 1 W/(m·K) and other portions exhibiting a thermal conductivity of less than 1 W/(m·K). While it is understood that one, two, three or four insulating walls 53 may be provided adjacent to one, two, three, or four sides of the duct 51 comprising such a portion, for purposes of simplicity and clarity, only one side of the duct 51 is depicted as being associated with an insulating wall 53 in FIGS. 10-12. Extending through the non-reactive gas space (not illustrated) in between the insulating wall 53 and the duct 51 are a plurality of metallic pipes 57. The metallic pipes 57 are fed by an inlet manifold 56, in turn fed by an inlet conduit 54 that conveys the relatively cooler (such as ambient temperature) combustion reactant. The preheated combustion reactant is withdrawn from the metallic pipes 57 by an outlet manifold 56' and withdrawn from the outlet manifold 56' by outlet conduit 54'. As described above, the embodiment of FIGS. 10-12 has the advantage that the furnace need not be shut down in order to repair or replace less than all of the metallic pipes 57. Rather, an operator need only remove the particular insulating wall 53 adjacent to the metallic pipe(s) 57 desired for repair or replacement while the recuperator 107 continues to function as normal.

FIG. 11 differs from FIG. 10 in that the insulating wall 53 is removed to reveal the portions 58 of the duct 51 that are comprised of a material having a thermal conductivity of more than 1 W/(m·K) while FIG. 12 additionally differs in that the middle extents of the metallic pipes 57 are not illustrated. Each of these portions 58 that have a thermal conductivity of more than 1 W/(m·K) may be removably inserted into an associated opening 58' in the duct 51. While the entirely of the duct 51, including both the portions 58 and the remaining portions (unnumbered for sake of clarity) may each be comprised of a material having a thermal conductivity of more than 1 W/(m·K), the embodiment of FIGS. 10-12 is especially advantageous when only the portions 58 are comprised of such a material and the remaining portions are comprised of a material that has a thermal conductivity of less than 1 W/(m·K). This is a special advantage of a ceramic duct (in comparison to a metallic duct) because the relatively lower conductivity material of much of the ceramic duct 51 might be expected to exhibit a greater ability, in contrast to the material of portions 58, to withstand prolonged contact with the relatively hot flue gas flowing through the interior of the ceramic duct 51 without being rendered porous, and therefore, exhibiting a greater ability to prevent a flow of hot flue gas, over a prolonged period of time, to enter into the non-reactive gas space between the insulating wall 53 and the ceramic duct 51. On the other hand, because the available selection of ceramic materials exhibiting a thermal conductivity of greater than 1 W/(m·K) may be relatively limited, in the event that such materials exhibit a decreased ability to withstand prolonged contact with hot flue gas (in contrast to the remaining portions of the ceramic duct 51) without becoming porous, the portions 58 may be removed and replaced at regular intervals in order to better ensure that no leaks of hot flue gas into the non-reactive gas space will be experienced. This may also be advantageous in the event that the material exhibiting a thermal conductivity of greater than 1 W/(m·K) is relatively more expensive than the material exhibiting a lower thermal conductivity.

When the portions 58 of the duct 51 (that are comprised of a material having a thermal conductivity of more than 1 W/(m·K)) reach the end of their service life, the portions 58 may be easily replaced by carefully removing them from the associated opening 58' and replacing them with a new portion 58 that has not been exposure to the hot flue gas. The ease of replacement may be improved by maintaining a weight of each portion 58 at or below 50 kg. This may be even more easily achieved by separating each portion 58 into a plurality of pieces that are stacked on top of one another in the associated opening 58'. Finally, each portion 58 (or individual piece) may be provided with one or more lifting lugs allowing the portion 58 (or individual piece) to be more easily and safely lifted in or out of place in the associated opening 58'.

Figure 13A:
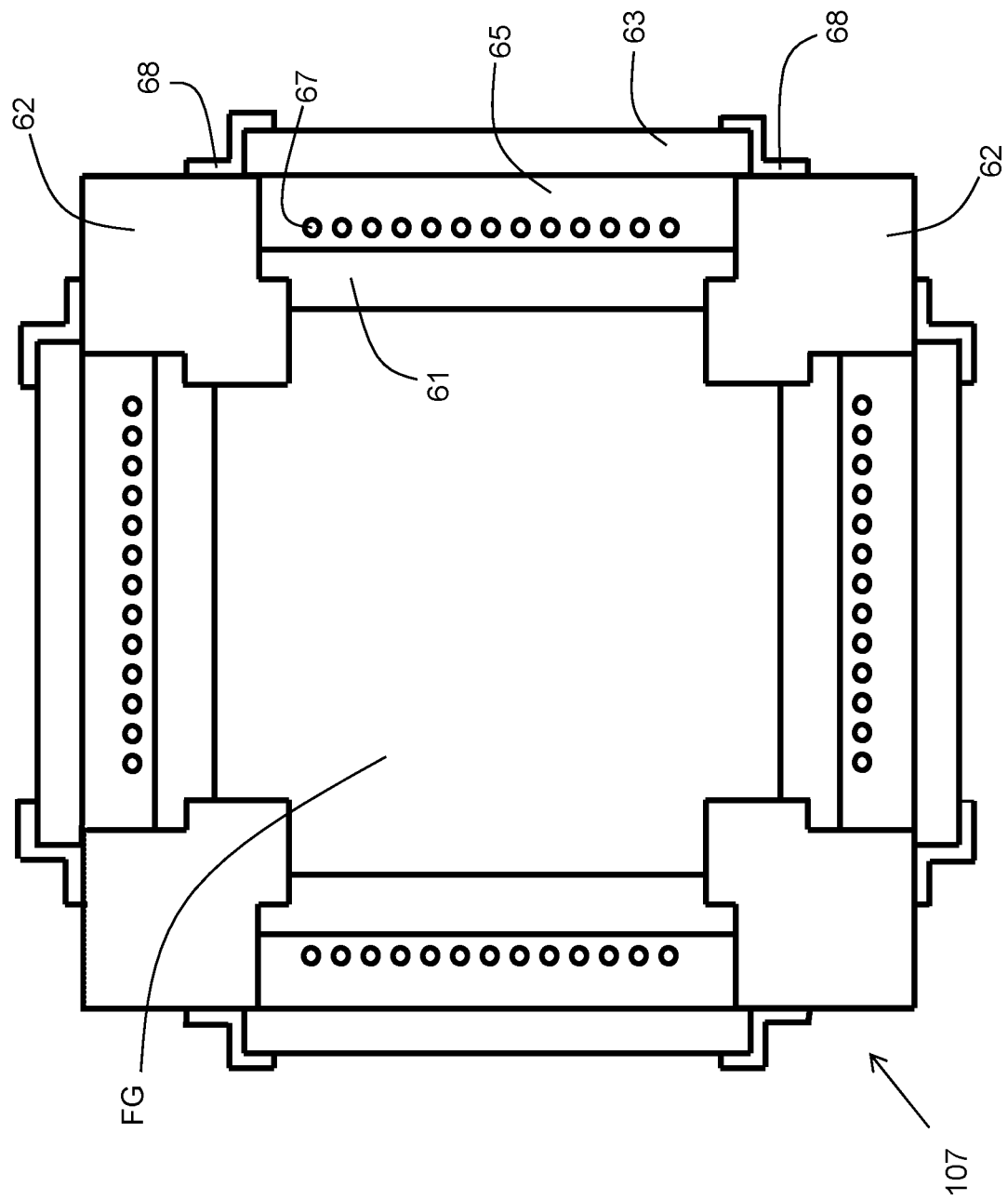
FIG. 13A is a top cross-sectional view schematic of another embodiment of the recuperator of the novel furnace.
Figure 13B:
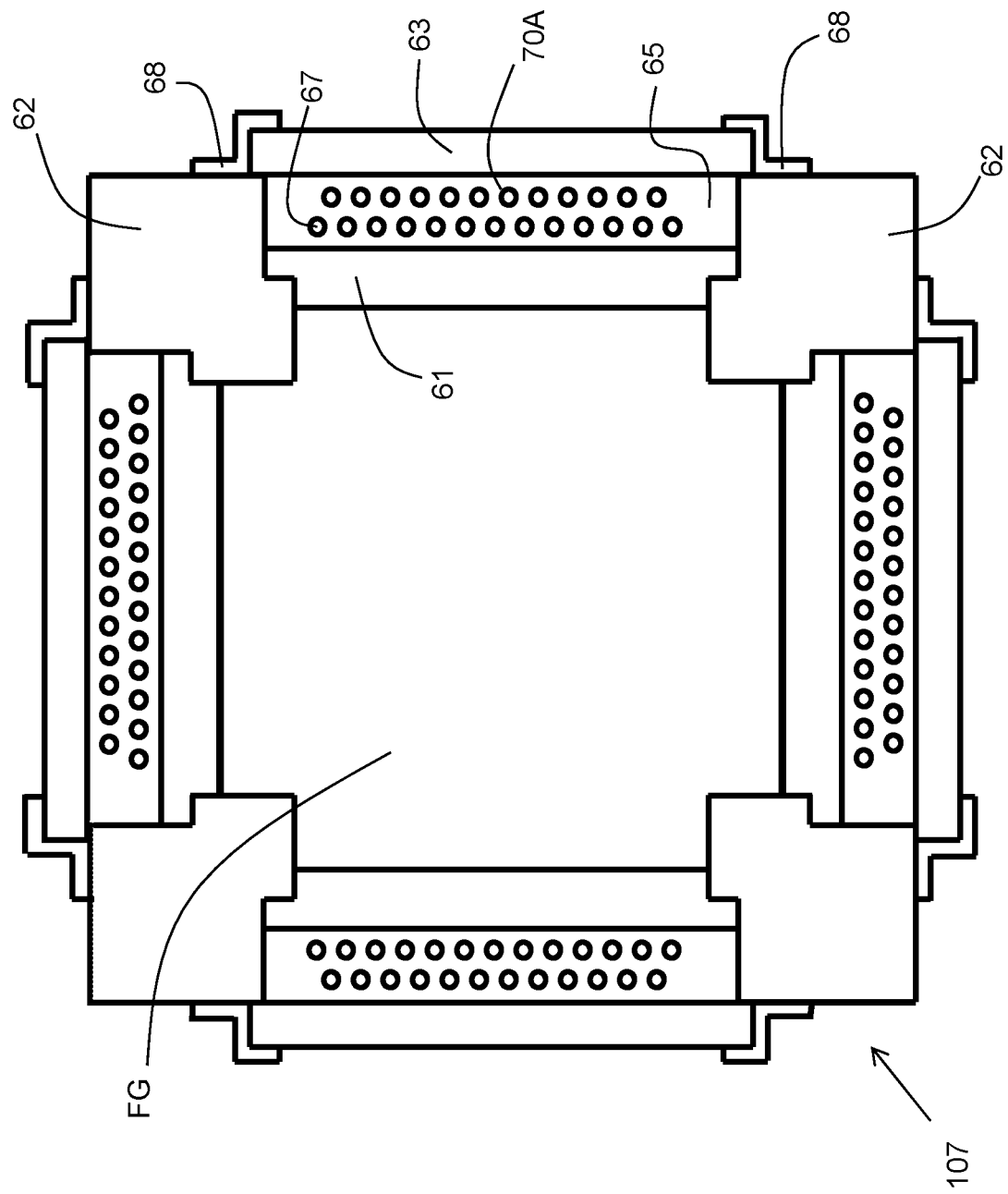
FIG. 13B is a top cross-sectional view schematic of yet another embodiment of the recuperator of the novel furnace.
Figure 13C:
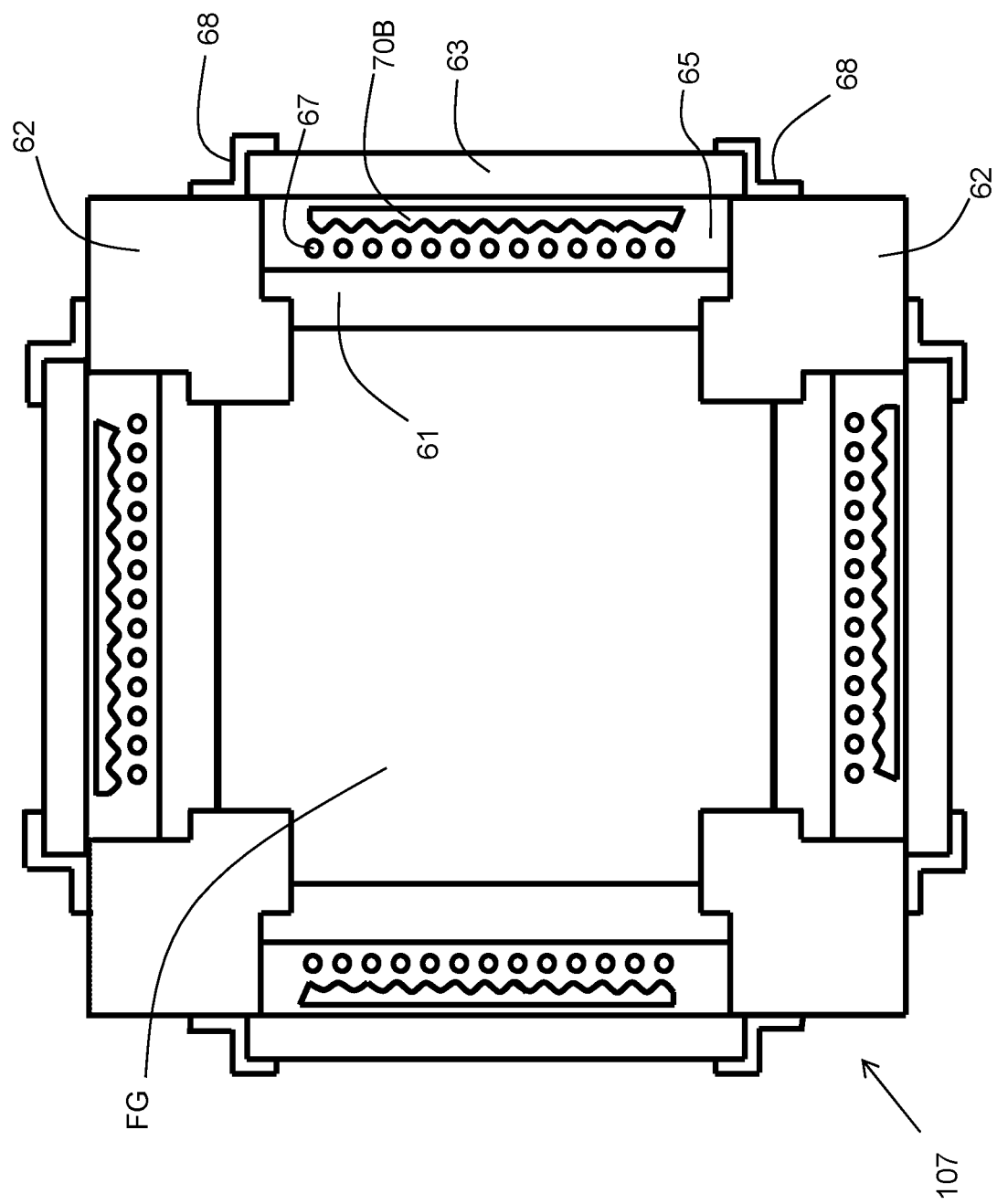
FIG. 13C is a top cross-sectional view schematic of still another embodiment of the recuperator of the novel furnace.
Figure 14A:
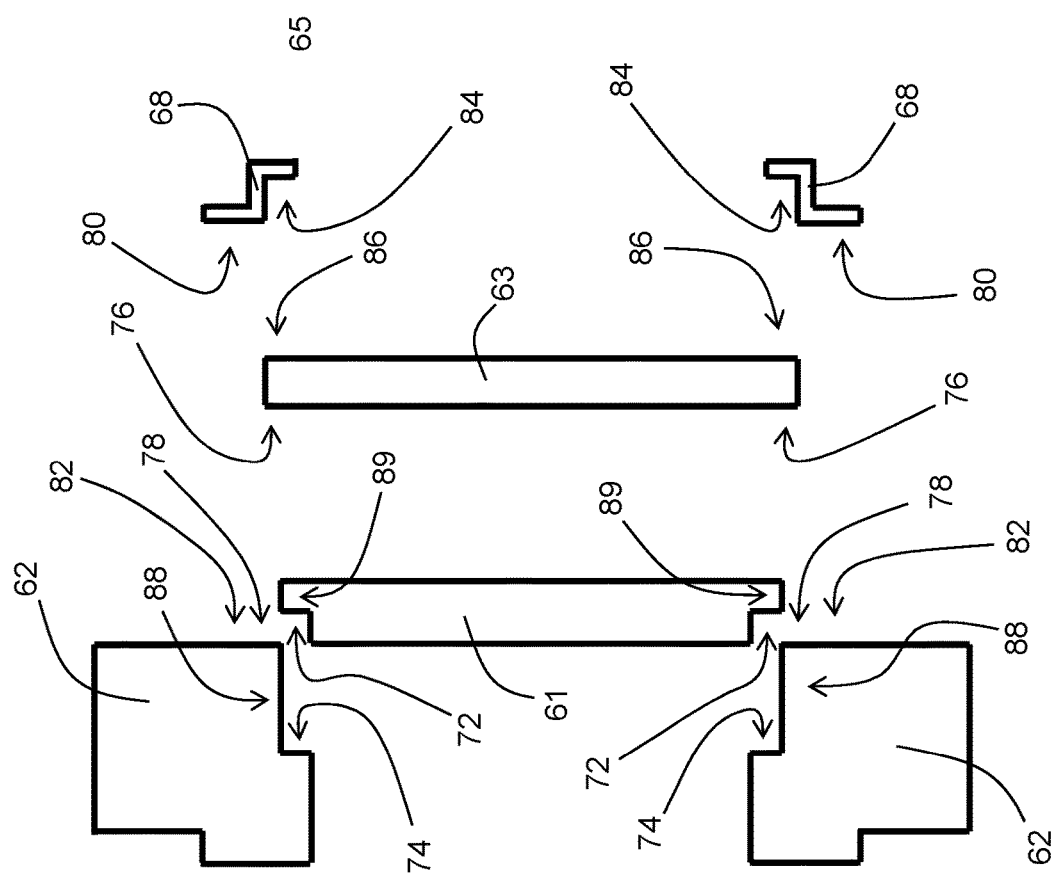
FIG. 14A is an exploded top cross-sectional view schematic of a portion of the embodiments of FIGS. 13A-C.
Figure 14B:
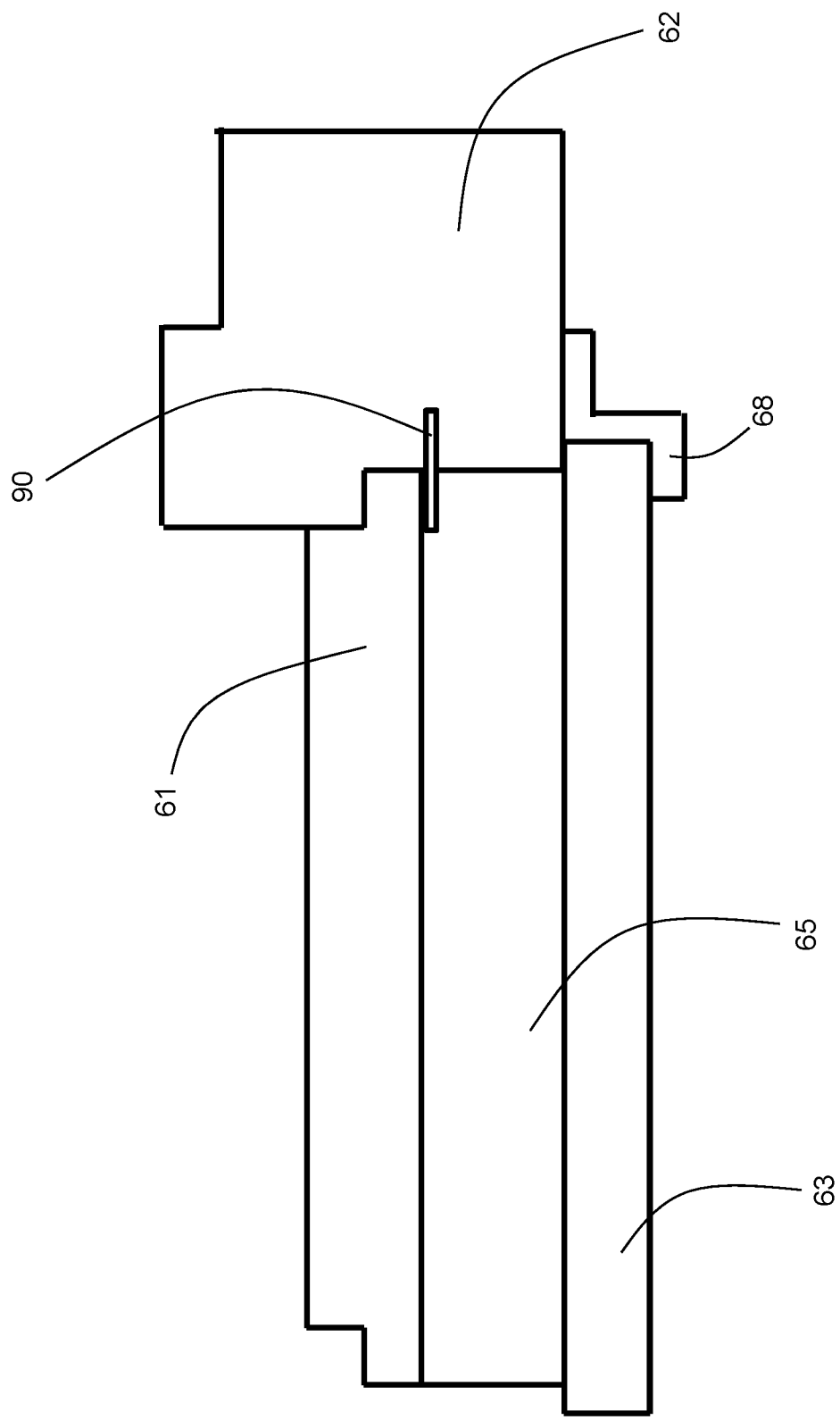
FIG. 14B is a top cross-sectional view schematic of a portion of the embodiments of FIGS. 13A-C including an optional shim for securing a duct portion.

Three embodiments of the inventive recuperator are illustrated in FIGS. 13A, 13B, and 13C, respectively. Certain features (some optional) common to each of these three embodiments are also illustrated in FIGS. 14A-14D. Each of the three embodiments includes a set of four structural pillars 62. Between each pair of adjacent pillars extends a duct portion 61 made of a material having the requisite thermal conductivity. Interior-facing surfaces of the pillars 62 and duct portions 61 enclose a space FG through which the flue gas flows.

The pillars 62 provide a mechanical support with which to secure the duct portions 61. More particularly, a stepped surface 72 at each end of a duct portion 61 abuts against a corresponding stepped surface 74 disposed at a respective corner of an adjacent pillar 62. Because the stepped surfaces 72 of the duct portions 61 abut against the stepped surfaces of the pillars 62, the duct portions 61 are prevented from falling into the space FG through which the flue gas flows. The duct portions 61 are also prevented from shifting side-to-side because each end face 89 of a given duct portion 61 abuts up against a corresponding side face 88 of an adjacent pillar 62.

Each of the inventive recuperator embodiments also includes a set of four insulating walls 63. Each insulating wall 63 extends parallel to a respective one of the duct portions 61. Between each pair of parallel extending duct portion 61 and insulating wall 63 is a non-reactive gas space 65. Extending through the non-reactive gas space 65 is a plurality of metallic pipes 67 through which a combustion reactant (either oxidant or fuel) flows and within which is preheated. The non-reactive gas spaces 65 are filled with a non-reactive gas (such as air, carbon dioxide, water vapor and/or nitrogen).

Each insulating wall 63 has a length greater than that of the adjacent non-reactive gas space 65 so as to enclose the non-reactive gas space 65 in between an outer surface of the adjacent duct portion 61, an inner surface of the insulating wall 63 and side faces 88 of the adjacent pillars 63. Each insulating wall 63 includes a peripheral end portion 76 of an interior face thereof that abuts against a portion 78 of an exterior face of an adjacent pillar 62. While each insulating wall 63 may be secured in place by any technique known in the field of combustion or heat transfer, optionally they may be secured to adjacent pillars 62 with brackets 68. Each bracket 68 includes an outer leg 80 that abuts against a portion 82 of an exterior face of an adjacent pillar 62 and is secured to that pillar 62 with a fastening device such as a bolt. Each bracket 68 also includes an inner leg 84 that abuts against a portion 86 of an exterior face of an adjacent insulating wall 63 and frictionally retains the insulating wall 63 against the portion 78. In the foregoing manner, each insulating wall 63 is prevented from falling towards or away from the non-reactive gas space 65.

While each of the duct portions 61 may be secured so as to prevent it from falling towards the adjacent non-reactive gas space 65 in any way known in the field of combustion or heat transfer, optionally, a shim 90 may be inserted partially into a slot formed in a side face 88 of an adjacent pillar 62. The portion of the shim 90 that is not inserted into the slot extends over a peripheral portion of an exterior face of the duct portion 61 in question so as to prevent that duct portion 61 from falling towards the adjacent non-reactive gas space 65.

The recuperator embodiments of FIGS. 13A-13C are not limited to a single set of four duct portions 61. Rather and as best illustrated in FIG. 14C, a plurality of duct portions 61 may be stacked on top of one another so as to form a combined duct portion that extends between an adjacent pair of pillars 62. While the duct portions 61 may be stacked in any way known in the field of combustion or heat transfer, as best shown in FIG. 14D, a projection 94 of a bottom portion of a first duct portion 61 fits within a corresponding cavity 96 of a second duct portion 61 underneath the first duct portion. This pattern is repeated for the other duct portions 61 of a combined duct portion that extends between the adjacent pair of pillars 62.

Optionally and as best shown in the embodiment of FIG. 13B, a plurality of cooling tubes 70A extend through the non-reactive gas space 65 in addition to the metallic pipes 67. A cooling fluid, such as water or air or nitrogen, flows through the cooling tubes 70A so as to help moderate the heating of the oxidant or fuel in the metallic pipes 67. Alternatively, and as best illustrated in the embodiment of FIG. 13C, instead of a plurality of cooling tubes 70A, a cooling panel 70B extends through the non-reactive gas space 65. The cooling panel 70B is corrugated so as to increase the surface area for receipt of radiant heat. Similar to the cooing tubes 70A of the embodiment of FIG. 13B, a cooling fluid, such as water or air, flows through the cooling panel 70B so as to help moderate the heating of the oxidant or fuel in the metallic pipes 67.

With respect to the embodiments of FIGS. 13A-13C, during operation, fuel and oxidant are injected from one or more burners mounted in a furnace wall of a furnace into a combustion space within a combustion chamber enclosed by a furnace wall of the furnace. The injected fuel and oxidant are combusted in the combustion space to produce thermal energy which is used to heat solid and/or molten glass or glassmaking materials or solid and/or molten metal and also produce flue gas. At least one of the fuel and oxidant is preheated.

The flue gas is received from the combustion chamber at a first end of the recuperator and discharged from a second, opposite end of the recuperator. The flue gas flows through the space FG defined by inner surfaces of the pillars 62 and duct portions 61. Heat is radiatively exchanged between the flue gas and the duct portions 61. Heat is exchanged between the duct portions 61 and the one or more metallic pipes 67 by radiative heat exchange across the non-reactive gas space 65. Heat is exchanged between the one or more metallic pipes 67 and either fuel or oxidant flowing through the pipe(s) 67 by convective heat exchange so as to provide preheated fuel or preheated oxidant, respectively. The preheated fuel or preheated oxidant is fed to the one or more burners for injection thereby. It should be noted that all of the metallic pipes 67 need not contain flows of only oxidant or only fuel. Rather, one set of metallic pipes 67 of an associated non-reactive gas space 65 may contain a flow of oxidant while another set of metallic pipes 67 of a different associated non-reactive gas space 65 may contain a flow of fuel. Also, within a given set of metallic pipes 67 in a given non-reactive gas space 65, one or more of the pipes 67 may contain a flow of oxidant while the remaining pipes 67 of that set may contain a flow of fuel.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of recuperative heat exchange for preheating a combustion reactant with waste heat energy from flue gas produced by a furnace, comprising:

injecting fuel and oxidant from one or more burners mounted in a furnace wall of a furnace into a combustion space within a combustion chamber enclosed by the furnace wall and combusting the injected fuel and oxidant in the combustion space thereby heating solid and/or molten glass or glassmaking materials or solid and/or molten metal and producing flue gas, at least one of the fuel and oxidant being preheated;

receiving the flue gas at a first end of a duct extending along an axis, one or more portions of the duct being comprised of a material having a thermal conductivity of greater than 1 W/(m·K);

discharging the received flue gas from a second end of the duct;

exchanging heat between the flue gas and the duct by radiative heat exchange;

exchanging heat between the duct and one or more metallic pipes by radiative heat exchange across an non-reactive gas space filled with non-reactive gas, the one or more metallic pipes extending through the non-reactive gas space, the non-reactive gas space being defined between an outer surface of the duct and an inner surface of an insulating wall that extends parallel to the duct axis and adjacent the outer surface of the duct;

exchanging heat between the one or more metallic pipes and either fuel or oxidant flowing through the one or more metallic pipes by convective heat exchange to provide preheated fuel or preheated oxidant; and feeding the preheated fuel or preheated oxidant to the one or more burners), wherein:

each of the one or more metallic pipes is gas-tight;

gaps exist in between, on one hand, the portion or portions with a thermal conductivity of more than 1 W/(m·K), and on the other hand, each of the one or more metallic pipes;

gaps exist between each of the one or more metallic pipes; and gaps exist between, on one hand, each of the at least one metallic pipes, and on the other hand, the insulating wall.

2. The method of claim 1, wherein the non-reactive gas is air, the non-reactive gas space freely communicates with ambient air, and no mechanical device is used to create a flow of air through the non-reactive gas space.

3. The method of claim 1, wherein fuel flows through the one or more pipes and preheated fuel is fed to the one or more burners.

4. The method of claim 1, wherein oxidant flows through the one or more pipes and preheated oxidant is fed to the one or more burners.

5. The method of claim 4, wherein the oxidant is oxygen-enriched air, industrially pure oxygen, a mixture of industrially pure oxygen and recirculated flue gas, or a mixture of industrially pure oxygen and carbon dioxide.

6. The method of claim 4, wherein the oxidant is industrially pure oxygen produced by a cryogenic air separation unit, a vapor swing adsorption unit, or a vaporizer fed with liquid oxygen from a liquid oxygen tank.

7. The method of claim 6, wherein a totality of all oxidant fed to the one or more burners has an oxygen content of at least 24% by volume.

8. The method of claim 1, wherein the material having a thermal conductivity of more than 1 W/(m·K) is a ceramic material or metal alloy.

9. The method of claim 1, wherein the material having a thermal conductivity of more than 1 W/(m·K) is a castable refractory having a SiC content of at least 30%.

10. The method of claim 1, wherein an entirety of the a duct is comprised of the material having a thermal conductivity of more than 1 W/(m·K).

11. The method of claim 1, wherein some portions of the duct is comprised of the material having a thermal conductivity of more than 1 W/(m·K) and remaining portions of the duct are comprised of a material having a thermal conductivity of less than or equal to 1 W/(m·K).

12. The method of claim 1, wherein fuel is flowing through the one or more metallic pipes and preheated fuel is fed to the one or more burners.

13. The method of claim 1, wherein fuel is flowing through some of the one or more metallic pipes, oxidant is flowing through other of the one or more metallic pipes, and preheated fuel and preheated oxidant are fed to the one or more burners.

14. The method of claim 1, wherein a temperature of the flue gas is 1,100-1,550° C.

15. The method of claim 1, wherein the furnace is a glass furnace and the injected fuel and oxidant are combusted in the combustion space thereby heating solid and/or molten glass or glassmaking materials.

16. The method of claim 1, wherein the furnace is a metal melting furnace and the injected fuel and oxidant are combusted in the combustion space thereby heating solid and/or molten metal.

* * * * *